US012145117B2

(12) United States Patent
Triantis

(10) Patent No.: US 12,145,117 B2
(45) Date of Patent: Nov. 19, 2024

(54) COSMETIC MANUFACTURING METHOD, APPARATUS FOR FORMULATING A CUSTOMISED COSMETIC PRODUCT, COSMETIC PRODUCT MIXER AND SERVER CONFIGURED FOR PREPARING A COSMETIC PRODUCT

(71) Applicant: Trigenex Ltd, Cheshire (GB)

(72) Inventor: Adam Triantis, Cheshire (GB)

(73) Assignee: Trigenex Ltd, Cheshire (GB)

( * ) Notice: Subject to any disclaimer, the term of this patent is extended or adjusted under 35 U.S.C. 154(b) by 852 days.

(21) Appl. No.: 17/251,541

(22) PCT Filed: Jun. 11, 2019

(86) PCT No.: PCT/GB2019/051615
§ 371 (c)(1),
(2) Date: Dec. 11, 2020

(87) PCT Pub. No.: WO2019/239120
PCT Pub. Date: Dec. 19, 2019

(65) Prior Publication Data

US 2021/0370250 A1 Dec. 2, 2021

(30) Foreign Application Priority Data

Jun. 11, 2018 (GB) ...................................... 1809548

(51) Int. Cl.
*B01F 33/452* (2022.01)
*B01F 23/40* (2022.01)
(Continued)

(52) U.S. Cl.
CPC .......... *B01F 33/452* (2022.01); *B01F 23/405* (2022.01); *B01F 23/4105* (2022.01);
(Continued)

(58) Field of Classification Search
CPC ........................... B01F 2101/21; B01F 33/452
(Continued)

(56) References Cited

U.S. PATENT DOCUMENTS 4,871,262 A * 10/1989 Krauss .................... G07F 17/18
366/605
6,412,658 B1 7/2002 Bartholomew et al.
(Continued)

OTHER PUBLICATIONS

GB Search Report for corresponding Application No. GB1809548.9, Nov. 28, 2018—4 pages.
(Continued)

*Primary Examiner* — David L Sorkin
(74) *Attorney, Agent, or Firm* — Dority & Manning, P.A.

(57) ABSTRACT

There is described a method of formulating a customised cosmetic product, comprising the steps of: a) dispensing ingredients according to a recipe for the cosmetic product into a vessel (422) containing a mixing component (1201); b) mixing the ingredients with the mixing component to form a mixed intermediate; and c) increasing the viscosity of the intermediate to form the cosmetic product by ceasing mixing and/or adding a further ingredient. An apparatus for formulating a customised cosmetic product comprising an inventory section, a dispensing section and a vessel located in the dispensing section is also described. Furthermore, a method and apparatus for formulating a customised cosmetic product comprising selecting a cosmetic product mixer from a plurality of cosmetic product mixers based on the generation of second data based on first data indicative of a biometric measurement of a user, are also described.

11 Claims, 7 Drawing Sheets

(51) Int. Cl.

| | |
|---|---|
| ***B01F 23/41*** | (2022.01) |
| ***B01F 23/47*** | (2022.01) |
| ***B01F 33/84*** | (2022.01) |
| ***B01F 35/71*** | (2022.01) |
| *B01F 101/21* | (2022.01) |

(52) U.S. Cl.
CPC .......... *B01F 23/47* (2022.01); *B01F 33/8442* (2022.01); *B01F 35/717611* (2022.01); *B01F 2101/21* (2022.01)

(58) Field of Classification Search
USPC .................................................. 366/273, 274
See application file for complete search history.

(56) References Cited

U.S. PATENT DOCUMENTS

2001/0047309 A1* 11/2001 Bartholomew ...... A45D 44/005 132/200
2006/0124196 A1* 6/2006 Bartholomew ..... B01F 35/2207 141/100
2014/0081463 A1 3/2014 Igarashi
2015/0021356 A1 1/2015 Witchell et al.
2016/0175620 A1 6/2016 Landa et al.
2017/0228892 A1 8/2017 Nichol et al.
2018/0200684 A1 7/2018 Fiastre et al.

OTHER PUBLICATIONS

PCT International Preliminary Report on Patentability for corresponding PCT Application No. PCT/GB2019/051615, mailed on Dec. 15, 2020, 12 pages.

PCT International Search Report and Written Opinion for corresponding PCT Application No. PCT/GB2019/051615, mailed on Nov. 8, 2019, 17 pages.

Office Action for corresponding Japanese application No. 19730528.7, dated Dec. 16, 2022, 9 pages.

* cited by examiner

COSMETIC MANUFACTURING METHOD, APPARATUS FOR FORMULATING A CUSTOMISED COSMETIC PRODUCT, COSMETIC PRODUCT MIXER AND SERVER CONFIGURED FOR PREPARING A COSMETIC PRODUCT

TECHNICAL FIELD

The disclosed subject matter relates to cosmetic manufacturing methods and apparatus, and in particular to providing customised cosmetic products.

BACKGROUND

Cosmetic products are used by people to improve their appearance, and include products such as colour cosmetics, haircare products, skincare products, deodorants and perfumes. Colour cosmetics may include products such as foundations, lipsticks, lip gloss, lip tint, concealer, nail lacquer/polish. Haircare products may include products such as shampoo, conditioner, serums, hair colourants. Skincare products may include products such as moisturiser creams, lotions, serums, sprays, deodorants.

Users of cosmetic products often want to wear a cosmetic product that matches one or more of their features, such as the colour of their skin. However, users typically have to select, from a discrete number of ready-made cosmetic products, a cosmetic product which most closely matches their features, such as skin colour. This is unsatisfactory as it can often be the case that the user requires a colour between two discrete colours of a particular ready-made cosmetic product. This makes it difficult for the user to select a cosmetic product which most closely matches their features.

Cosmetic products are typically emulsions, the stability of which is maintained by the use of thickeners to produce highly viscous liquids, which cannot readily phase separate. Even cosmetic products that are not emulsions are often high viscosity single-phase fluids. Mixing of these ingredients to produce high viscosity liquids is an energy intensive process which can require long time periods to produce well-mixed products. As a result ready-made cosmetic products are manufactured in industrial settings, typically using heavy machinery such as homogenisers or high shear mixers which must be cleaned between batches. Such an industrial setting is not configured to provide customised cosmetic products for different people. For example, each individual ready-made cosmetic product comprises a plurality of ingredients which have been mixed together in a pre-determined quantity on an industrial scale, so as to achieve a cosmetic product having a discrete colour. Given the industrial scale of manufacture, a manufacturer will only produce a cosmetic product having a limited number of discrete colours, from which a user must choose from.

In addition, ready-made cosmetics are required to be physically stable (e.g. emulsions that cannot phase separate) for periods of up to 3 years in order to satisfy shelf-life requirements prior to purchase by consumers. In addition to emulsion stability, there are concerns over microbial growth as cosmetic products usually have a high water contents, ranging from 30 to 90 wt %, and may provide fertile media for microbial growth, meaning that many cosmetic products must further include preservatives. The stability of ingredients within cosmetic products (particularly those derived from natural sources) to oxidative or photo degradation is also a concern, leading to a preference to minimizing exposure to atmosphere and/or light during and after formulation. All of these concerns lead to considerable challenges from a formulatory perspective.

Therefore, there exists a need to provide improved methods of manufacturing custom cosmetic products and apparatus for enacting such methods.

SUMMARY OF INVENTION

In a first aspect there is provided a method of formulating a customised cosmetic product, the method comprising the steps of: a) dispensing ingredients according to a recipe for the cosmetic product into a vessel containing a mixing component; b) mixing the ingredients with the mixing component to form a mixed intermediate; and c) increasing the viscosity of the mixed intermediate to form the cosmetic product by: (i) ceasing mixing of the mixed intermediate; (ii) ceasing mixing of, and adding a further ingredient to, the mixed intermediate; or (iii) adding a further ingredient to the mixed intermediate, optionally with continued mixing using the mixing component.

Advantageously, by increasing viscosity of the customised cosmetic product in the vessel, the step of increasing viscosity happens further along the mixing stage than previous methods, reducing the energy required when mixing. As such, the method of the first aspect is suitable for mixing on a small scale, where power limitation may need to be taken into account.

The vessel may be a container which is provided to a user. That is, the vessel may be the one and only container in which the customised cosmetic product is contained within until being supplied to the user.

The ingredients that are dispensed into the vessel will preferably be of low viscosity (either intrinsically or due to being thixotropic substances to which shear forces are being applied) during the mixing step, thereby minimizing the energy and time required to produce a well-mixed intermediate and, ultimately, a cosmetic product. The cosmetic product may be produced in under 5 minutes, optionally in under 4 minutes, further optionally in under 3 minutes, yet further optionally in under 2 minutes.

The mixing component may be a magnetic stirrer bar and mixing may be effected by a magnetic stirrer. Typically, the magnetic stirrer effects motion of the magnetic stirrer bar (and therefore mixing of the ingredients) by the production of a moving magnetic field to which the magnetic stirrer bar is coupled, causing rotation of the magnetic stirrer bar.

The magnetic stirrer bar may be free in the vessel and directly contact the dispensed ingredients. Alternatively, the stirrer bar may be contained in a separate compartment in the vessel and be adapted to drive a paddle (or similar) located within the compartment of the vessel into which the ingredients are dispensed. Magnetic stirrer bars come in many shapes and sizes and it will be understood that a suitable size and shape may be selected for any given application of the basis of, among other factors, the size and shape of the vessel, the nature of the ingredients and the desired stirrer speed. Magnetic stirrer bars may also have a variety of coatings to protect the magnetic portion and permit easy cleaning, for example PTFE. The cores of magnetic stirrer bars comprise permanent magnets, such as neodymium magnets. Use of such stirrers is advantageous as they are a low energy method of mixing.

Alternatively, the vessel may comprise a paddle or stirrer that is mechanically driven by an external motor. Further alternatively, the vessel may be rotated to effect mixing.

The vessel may be configured such that the mixing component is capable of mixing the entire volume of the dispensed ingredients in the vessel. This permits the mixer to mix the entire contents of the vessel, ensuring that the intermediate is homogeneous. For example, if the mixing component is a magnetic stirrer bar, configuring the vessel will involve selecting a vessel, taking into account the viscosities of the ingredients to be mixed, whose size and shape is such that the stirrer bar will be able to stir the entire volume of ingredients which are added.

The vessel may be configured such that the mixing component is capable of mixing only a portion of dispensed ingredients in the volume of the vessel at a time and the mixing component is capable of moving within the vessel such that the entire volume of dispensed ingredients in the vessel is mixed. Some cosmetic products are dispensed in vessels whose size and/or shape do not permit the entire contents to be mixed simultaneously. For example, the vessel may have a high aspect ratio (e.g. its length may be significantly greater than its diameter) and the mixing component is only able to effect mixing in a portion of the vessel at any one time. This can be overcome by moving the mixing component throughout the vessel, such that, over time, the entire contents of the vessel are mixed. For the example of a magnetic stirrer bar, the stirrer bar may be held in the axis of the rotating magnetic field and the vessel (and its contents) moved around it. Alternatively, the rotating magnetic field may be moved such that the stirrer bar moves within the vessel to achieve the same effect.

The mixing component may be retained in the vessel. Once the vessel is removed from the location in which the mixing occurs (e.g. a dispensing section of a formulating apparatus) the mixing component is taken with it. This removes the need to clean the mixing component before proceeding with the formulation of the next product, while also safeguarding against cross-contamination of products. As a further advantage, the provision of the mixing component in the vessel permits further optional mixing to be performed by the user at a time after dispensing by manual shaking of the vessel.

Alternatively, the mixing component may be removed from the vessel. Removal and collection of the mixing components permits them to be cleaned and reused, thereby reducing operational costs. In the example of a magnetic stirrer bar, a magnet may be used to remove the stirrer bar through the aperture of the vessel without the need to interact with the contents of the vessel.

The ingredients may be dispensed directly into the vessel from one or more reservoirs. The one or more reservoirs may be sealed. By sealed, it is meant that the reservoirs are airtight, save for the connections required for dispensing to the vessel. Being airtight prevents the ingress of water and/or oxygen, thereby preventing premature degradation of the ingredients. Dispensing the ingredients directly into the vessel means that they only come into contact within the vessel and cannot therefore increase in viscosity prematurely and cause blockages. This also prevents cross contamination and obviates the need for cleaning a mixer.

Dispensing may be effected by pumping the ingredients from the one or more reservoirs. Substantially any pump may be used, for example a syringe pump. The pumping may be effected by a peristaltic pump. Such pumps are highly accurate, with 10 to 20 μL accuracy. Peristaltic pumps operate by applying force to the outside of a tube; this simplifies the flow path of the material within, reducing the resistance to pumping and permitting the pumping of viscous ingredients and suspensions.

The one or more reservoirs may have a predefined volume. By being of a known volume and monitoring the quantity of each ingredient that has been dispensed, the quantity of each ingredient remaining can be easily quantified and the reservoir replaced and/or refilled at an appropriate time. An alternative method of achieving this goal would be to utilise sensors to determine the quantity of each ingredient remaining and when the reservoir requires replacing.

A feedback mechanism (for example, monitoring the weights of the vessel and the reservoirs) may be used to monitor the dispensing process by comparing the quantity of each ingredient that is removed from the reservoir and comparing with the quantity of ingredients delivered to the vessel. This would allow for the detection of ingredient loss (e.g. through leaks) and calibration of pump parameters based on the physical properties of the ingredients, the work being done by the pump and the dispensing rate.

The one or more reservoirs may be low friction plunger cartridges. Such cartridges are sealed, protecting their contents, and require little additional energy to pump from than open containers due to their low friction design. The quantity of ingredient remaining in the cartridge may be determined by monitoring of the position of the plunger. A further benefit lies in the low friction between the plunger and the cartridge wall, which results in greatly reduced back pressure, this is particularly beneficial for use with peristaltic pumps which are susceptible to the effects of back pressure.

Alternatively, the reservoirs may be in the form of pouches, the flexible walls of which provide little back pressure.

One or more of the ingredients may be thixotropic (i.e. shear thinning). Such ingredients may be maintained in a low-viscosity state by the application of force (e.g. by the mixing component), but increase in viscosity when the force ceases to be applied (e.g. when the mixing component becomes stationary).

The further ingredient may comprise salt. The salt may be any common inorganic salt that is soluble in water, such as NaCl or KCl.

It may be that the mixed intermediate is non-aqueous and comprises a water thickening agent and the further ingredient comprises water. A non-aqueous mixed intermediate that comprises a water thickening agent is obtained when all of the dispensed ingredients are non-aqueous and at least one of the dispensed ingredients comprises a water thickening agent.

It may be that the mixed intermediate is aqueous and the further ingredient comprises a water thickening agent. An aqueous mixed intermediate is obtained when at least one of the dispensed ingredients comprises water. It is preferred that any dispensed ingredients are miscible with the dispensed ingredient comprising water (i.e. the mixed intermediate is preferably a single phase).

The high viscosity of the final product is ensured by three mechanisms. Firstly, in the case of thixotropic ingredients, ceasing mixing ends the application of shear forces sufficient to reduce the viscosity of the thixotropic substances, resulting in thickening of the intermediate to produce the cosmetic product.

Secondly, the addition of salt to intermediates comprising certain ingredients (e.g. anionic surfactants) can result in increased viscosity. Without wishing to be bound by theory, this is believed to be caused by the screening of charges between micelles, permitting closer packing of the micelles and therefore higher viscosity.

Thirdly, in the case of emulsion products, the ingredients that are mixed to form the intermediate, including a water thickening agent (i.e. an agent that has high viscosity in the presence of water), are the first phase and the further ingredient is the second phase. On mixing, the water thickening agent transfers into the water phase, thickening the emulsion. It is more common for the first phase that forms the intermediate to be the oil phase and the second phase to form the further ingredient is the water phase, but it will be understood that the reverse case may also occur. Examples of water thickening agents include carbomer (polyacrylic acid) and its salts, polyethylene glycols, vegetable gums, and cellulose and its derivatives.

Any of the three mechanisms described above may occur individually, although it will be understood that two or more of the mechanisms may also operate either simultaneously or sequentially (e.g. the formation of the emulsion being done under stirring causes an increase in viscosity by the second mechanism, subsequent cessation of the stirring will then cause a further increase in viscosity by the first mechanism). It is advantageous to perform the thickening step last as it reduces the energy and time requirements for the earlier mixing steps compared to beginning with thickening first. This reduction in energy and time requirements permits miniaturisation of the formulating apparatus so that it is economical to prepare cosmetic products that are customised for particular users.

During performance of the method, the vessel may be in a protective atmosphere (i.e. in a sealed chamber) to prevent the ingress of contaminants such as dust or allergens. The protective atmosphere may be an inert gas to prevent exposure of the ingredients in the vessel to water and oxygen, thereby maximising the life span of the cosmetic product.

The vessel may be sealed after formation of the cosmetic product. Provision of the cosmetic product in a sealed vessel facilitates subsequent transport of the cosmetic product by the user. It also protects the cosmetic product from the environment (e.g. moisture and oxygen). The user may subsequently break the seal and access the cosmetic product at a time of their choosing. The seal may be reversible (i.e. the seal may be reapplied after being broken). Examples of seals include plastic films, screw tops and snap fittings. The seal may further comprise an applicator for the cosmetic product (e.g. a brush for the application of a nail polish or a slit valve for the dispensing of a shampoo).

The vessel may be any vessel that is used to package, vend and/or apply cosmetics and may be selected depending on the cosmetic product that is to be produced. The vessel may be any suitable vessel such as a jar, tube, pot or bottle. The vessel may comprise any suitable material such as plastic, metal or glass. Transparent vessels are preferred as they permit visual inspection of the cosmetic product. The vessel may be flexible to permit dispensing of the cosmetic product by squeezing of the vessel. In embodiments wherein the mixing component is a magnetic stirrer bar, it is preferred that the wall of the vessel proximate to the magnetic stirrer (e.g. the base of the vessel should the magnetic stirrer be located below the vessel) is thin, thereby enhancing the transfer of energy between the magnetic stirrer and the magnetic stirrer bar.

In some implementations, the vessel may have a volume of less than or equal to 500 ml. For example, cosmetic products are typically provided in containers of standard sizes, which are typically less than 500 ml.

The cosmetic product may be a coloured cosmetics product, such as a foundation, lipstick, lip gloss, lip tint, concealer, nail lacquer/polish, for example. The coloured cosmetic product may also be a hair colourant.

In a second aspect there is provided an apparatus for formulating a customised cosmetic product comprising: a dispensing section configured to house a vessel containing a mixing component; means for activating the mixing component, the means in or proximate to the dispensing section; an inventory section configured to house one or more reservoirs for ingredients; and one or more dispensing tubes configured to provide fluid communication between the or each reservoir and the vessel when the or each reservoir is located in the inventory section and the vessel is located in the dispensing section respectively.

Separation of the mixing component and its means of activation permits the apparatus to mix ingredients without the need to clean the apparatus between runs while also preventing cross-contamination. This makes the apparatus particularly suitable for small scale cosmetic production, especially where there may be a demand such that throughput of different products is high.

Each dispensing tube may individually be formed from a single tube. That is, there may be no intermediate connections (which physically split the dispensing tube) between a first end of the dispensing tube and a second end of the dispensing tube.

The mixing component may be a magnetic stirrer bar and the means for activating the mixing component is a magnetic stirrer. The mixing component acts on the ingredients to form the mixture, the means for activating the mixing component provides energy and force to the mixing component. Such a set-up has low energy requirements while still maintaining effective mixing of the low viscosity intermediate. Typically, the magnetic stirrer is located below the vessel and the magnetic stirrer bar rotates in the horizontal plane, however, there is no limitation and the magnetic stirrer may be located to one side of the vessel and the magnetic stirrer bar rotates in the vertical plane, or any intermediate position. The apparatus may further comprise means to move the magnetic stirrer bar relative to the vessel such that the plane in which the magnetic stirrer bar is altered and/or the axis of rotation of the magnetic stirrer bar is moved within the vessel. This permits complete mixing even in situations where the magnetic stirrer bar cannot mix the entire volume of the dispensed ingredients in the vessel simultaneously. The magnetic stirrer provides energy to the magnetic stirrer bar (activating it) by generating a moving magnetic field. This may be achieved through the use of a physical propeller with permanent magnetics or via an electromagnetic field.

The or each dispensing tube may be provided with a pump, preferably a peristaltic pump. The or each dispensing tube may provide a single, uninterrupted fluid pathway between the or each reservoir and the mixing vessel. The removal of joins and other components permits the pumping of more viscous ingredients as the friction is reduced, it also reduces the incidence of blockages as there are fewer locations where particulates (e.g. suspended particles such as mica) may adhere. The reduction in the number of connections also reduces the chances of leakages from connections or unintended disconnection.

The or each reservoir may be a sealed reservoir. By sealed, it is meant that the reservoirs are airtight, save for the connections required for dispensing to the vessel. Being airtight prevents the ingress of water and/or oxygen, thereby preventing premature degradation of the ingredients.

The or each reservoir may have a predefined volume. By being of a known volume and monitoring the quantity of each ingredient that has been dispensed, the quantity of each ingredient remaining can be easily quantified and the reservoir replaced and/or refilled at an appropriate time. An alternative method of achieving this goal would be to utilise sensors to determine the quantity of each ingredient remaining and when the reservoir requires replacing.

The or each reservoir may be a low friction plunger cartridge. Such cartridges are sealed, protecting their contents, and require little additional energy to pump from than open containers due to their low friction design. The quantity of ingredient remaining in the cartridge may be determined by monitoring of the position of the plunger.

The apparatus may further comprise means for connection to mains water.

The formulating apparatus may further comprise monitoring means operable to monitor the quantities of ingredients that are taken from the reservoirs and the quantities of ingredients dispensed into the vessel. Any suitable sensors may be used (such as mass balances, capacitive sensors, light-based sensors). For example, each reservoir and the vessel may be provided with a load cell to measure their mass.

The apparatus may further comprise means for removing the mixing component from the vessel via its aperture. For example, if the mixing component is a magnetic stirrer bar a magnet may be positioned such that the vessel passes below it as the vessel is moved from the dispensing section. The mixing components may be washed and recycled within the apparatus. Alternatively, the mixing components may be collected and removed from the machine for cleaning.

The formulating apparatus may further comprise a sealing apparatus configured to seal the vessel after formation of the cosmetic product. The sealing apparatus may comprise means for attaching a replaceable closure (e.g. a lid) to the vessel. Alternatively, or additionally, the sealing apparatus may comprise means for attaching a film to the aperture of the vessel (e.g. by an adhesive or heat-sealing).

In a third aspect there is provided a method for preparing (e.g. formulating) a customised cosmetic product. The method comprises receiving first data, the first data indicative of a biometric measurement of the user, generating second data based at least on the first data, the second data indicative of a recipe of a cosmetic product, selecting a cosmetic product mixer from a plurality of cosmetic product mixers, said selection based at least on the second data, and outputting the second data to the selected cosmetic product mixer.

Advantageously, a customised cosmetic product may be produced, where the cosmetic product is based on a biometric measurement of the user. The biometric measurement may comprise any physical characteristic of the user. For example, the biometric measurement may comprise any of a measurement of the colour of the user's skin, colour of the user's hair, skin moisture level, skin sebum level, hair colour, etc.

In the case where the biometric measurement is a colour of the user's skin or hair, the first data may, for example, be values in a colour space, such as the CIELAB colour space. Based on the first data, a recipe for the cosmetic product may be determined so as to accurately match the colour of the user's skin. For example, generating the second data may comprise determining a plurality of ingredients and associated quantities of said ingredients to be mixed to produce the cosmetic product. Selecting a cosmetic product mixer based on the second data may comprise selecting a cosmetic product mixer that is able to mix and prepare a cosmetic product based on the recipe, e.g. has the required ingredients.

Any of the receiving, generating, selecting or outputting steps may be carried out at a server. The server may connect to the cosmetic product mixers via any suitable network, such as the internet. The first data may be transmitted to the server by a user device.

As described above, the cosmetic product may be a coloured cosmetics product, such as a foundation, lipstick, lip gloss, lip tint, concealer, nail lacquer/polish, for example. The coloured cosmetic product may also be a hair colourant.

The outputting of the second data may be over any suitable network, such as the internet.

The plurality of cosmetic product mixers may be located at different geographical locations from each other. In this way, a decentralised model is provided, where the cosmetic product mixers are distributed over a range of different locations. The cosmetic product mixers may be described as portable, in that they may be installed in easy accessible locations for a user, such as shops, cafes, restaurants, bars, gyms, etc., in a similar manner to vending machines. Cosmetic product mixers may also be installed in a user's home. Providing a number of cosmetic product mixers also allows different ingredients to be installed in different cosmetic product mixers, allowing for a large range of possible combinations of ingredients than would otherwise be obtainable using a single mixer, especially a "portable" cosmetic product mixer having limited size and thus limited capacity to store a large number of different ingredients.

Generating the first data may comprise imaging a portion of the user to obtain the first data, wherein the biometric measurement is a measurement of a colour associated with the user.

For example, generating the first data may comprise imaging a portion of the user's skin to obtain first data, wherein the biometric measurement is a measurement a colour of the user's skin.

For example, the first data may be generated using an imaging device having a light source and light detector. As an example a surface of the imaging device may be placed on the user's skin, the surface comprising a recess, the recess comprising the light source and light sensor. The skin may be irradiated with light from the light source, and light reflected from the skin is recorded using the light sensor. The imaging device may output the first data in any suitable way, such as to a server or to a user device, such as a mobile phone, PDA, PC, laptop, or smartwatch for example. The first data may be output over any suitable network, such as the internet.

A plurality of ingredients, based on the second data, may be mixed so as to produce a cosmetic product and the cosmetic product may be dispensed.

The selected cosmetic product mixer may mix and dispense the cosmetic product when it receives the second data, or at a later time. For example, the cosmetic product mixer may dispense the cosmetic product into a vessel (e.g. a container) when it receives the second data, and the container may be stored for, or posted to, the user. Alternatively, the cosmetic product mixer may store the second data and wait until the user instructs the cosmetic product mixer to mix and dispense the cosmetic product.

Selecting a cosmetic product mixer from a plurality of cosmetic product mixers based on the second data may comprise selecting the cosmetic product mixer based on a determination that the cosmetic product mixer comprises required ingredients of the recipe.

For example, different cosmetic product mixers may comprise different combinations of ingredients. In a given situation, only a subset of the cosmetic product mixers may comprise the correct ingredients.

Data indicative of which cosmetic product mixers comprise which ingredients, and in what quantities, may be stored in a database accessible by the server. The data indicative of which cosmetic product mixers comprise what ingredients may be uploaded to the database by the cosmetic product mixers or by an authorised user. For example, an authorised user, such as a service technician, may load a new ingredient into the cosmetic product mixer and may manually update the database to indicate that the cosmetic product mixer comprises the new ingredient. Alternatively, the cosmetic product mixer may automatically or otherwise detect the newly loaded ingredient, by for example reading a barcode, and may update the database.

Selecting a cosmetic product mixer from a plurality of cosmetic product mixers may further comprise receiving third data indicative of a location associated with the user, determining fourth data indicative of locations associated with the plurality of cosmetic product mixers, and selecting the cosmetic product mixer based on the third data and fourth data.

For example, the third data may comprise the location of the user, such as their address or geo-coordinates, or a location that the user has specified. The fourth data may comprise an address or geo-coordinates of the cosmetic product mixer. The third and fourth data may be accessible from a database. The database may be the same database as the database comprising the data indicative of which cosmetic product mixers comprise which ingredients, and in what quantities.

Selecting the cosmetic product mixer based on the third and fourth data may comprise selecting the cosmetic product mixer which is located closest to the user's location or selected location.

The third data may be received by the server at the same time as the first data is received by the server. For example, the user device, or imaging device, may provide the location data when it uploads the first data to the server. Alternatively, the third data may be accessed from a database accessible by the server. For example, the server may access a database which contains the user accounts, where the user accounts comprise details of each registered user, including location information.

The server may first determine a subset of cosmetic product mixers which comprise the plurality of ingredients to be mixed. The server may then select from the subset, one of the cosmetic product mixers which is located closest to the user's location or the user's selected location.

The method may further comprise, at the cosmetic product mixer, storing in a memory the second data, receiving a command at a user interface and on receiving the command, mixing the plurality of ingredients to produce the cosmetic product based on the second data and dispensing the cosmetic product.

For example, the cosmetic product mixer may comprise a user interface, such as a touch screen, keyboard, keypad, or the like, which may be used by the user to instruct the cosmetic product mixer to mix the plurality of ingredients to produce a cosmetic product. That is, a user may have imaged their skin and sent the first data to the server at a first time, such as a first day, and then at a second time, such as a second day, the user may go to collect the cosmetic product from the cosmetic product mixer. On collection, the user may instruct the cosmetic product mixer to mix the cosmetic product by inputting an appropriate command into the user interface. Mixing at the time a user collects improves the lifetime of the cosmetic product, since the cosmetic product does not have to be stored prior to use. Of course, the user interface could be on a user's device, such as a smartphone, where commands entered at the user interface are transmitted to the given cosmetic product mixer. Said transmission may be via the server.

The step of mixing the cosmetic product may comprise the method of formulating the cosmetic product according to the first aspect of the invention.

The cosmetic product mixer used in the third aspect may comprise the formulating apparatus of the second aspect of the invention.

The formulating apparatus of the second aspect (or the method of the first aspect) is particularly suited to be used with the method of the third aspect, given the method and formulating apparatus' suitability for mixing on a small scale (relative to an industrial mixer). That is, the formulating apparatus of the second aspect can be easily distributed to a number of different locations which can be connected with the server of third aspect so as to provide a decentralised mixing system.

In alternative arrangement, mixing the plurality of ingredients to produce the cosmetic product based on the second data may comprise using any one of a mixer comprising a Venturi mixer, a mixer comprising a static mixer or a mixer comprising a rotating funnel mixer. In said alternative arrangements, mixing is carried out prior to being dispensed into a container (e.g. vessel).

Venturi mixers, static mixers or a mixer comprising a rotating funnel are advantageous as they can be used for mixing on a relatively small scale, in contrast to the size of an industrial cosmetics mixer, which typically use relatively slowly rotating paddles to mix ingredients.

In a fourth aspect there is provided a server. The server is configured to receive first data, the first data indicative of a biometric measurement of the user, generate second data based at least on the first data, the second data indicative of a recipe for the cosmetic product, select a cosmetic product mixer from a plurality of cosmetic product mixers, said selection based at least on the second data, and output the second data to the selected cosmetic product mixer.

The server may be the server described in relation to the third aspect.

In a fifth aspect there is provided a cosmetic product mixer for producing a cosmetic product. The cosmetic product mixer is configured to receive second data, the second data having been generated based at least on first data, the first data indicative of a biometric measurement of a user, the second data indicative of a recipe for the cosmetic product, the cosmetic product mixer having been selected from a plurality of cosmetic product mixers, said selection based at least on the second data, mix a plurality of ingredients to produce a cosmetic product based on the second data, and dispense the cosmetic product.

The cosmetic product mixer of the fifth aspect may comprise the formulating apparatus of the second aspect of the invention, and/or may be the cosmetic product mixer described in relation to the third and fourth aspects.

The cosmetic product mixer may be an IoT device.

In a sixth aspect there is provided a computer readable medium storing computer readable code, the computer readable code configured to cause one or more processers to carry out the method of the first and third aspects of the invention.

In a seventh aspect there is provided a cosmetic product mixer for producing a cosmetic product. The cosmetic product mixer comprises, means to receive first data indicative of a biometric measurement of the user, a formulating apparatus according to the second aspect of the invention, and a processor configured to direct the formulating apparatus to prepare a customised cosmetic product based on the first data.

That is, the cosmetic product mixer of the seventh aspect may receive the first data indicative of a biometric measurement of the user and may use this when preparing the cosmetic product, rather than receiving the second data described above. The first data may be the first data described above. In this aspect, a server as previously described may or may not be used. The cosmetic product mixer may obtain the first data via any suitable method, such as receiving the first data directly from the user.

The biometric measurement may comprise any physical characteristic of the user. For biometric measurement may comprise any of a measurement of the colour of the user's skin, colour of the user's hair, skin moisture level, skin sebum level, etc. The first data may encode CIELAB values which correspond to the colour of the user's skin, for example.

The processor may process the first data to generate data indicative of a recipe of a cosmetic product. Alternatively, the first data may comprise data indicative of a recipe of a cosmetic product, where the data indicative of a recipe of a cosmetic product is based on a biometric measurement of the user.

The means to receive the first data may comprise a user interface.

For example, the user interface may be a touchscreen or keyboard in which a user can input the first data. For example, the first data may be a hex-code that the user inputs.

The means to receive the first data may comprise a transceiver.

For example, the transceiver may be connected to a network such as the internet, and may receive the first data over the internet.

The processing module may be configured to generate second data based at least on the first data, the second data indicative of a recipe for the cosmetic product.

For example, the first data received at the cosmetic product mixer may be data indicative of the colour of a user's skin. The processor may generate a recipe for the cosmetic product based on the first data, such that the cosmetic product matches the user's skin, for example. Alternatively, the first data received by the cosmetic product mixer may be data indicative of a recipe for the cosmetic product. For example, a server may have already generated the data indicative of a recipe for the cosmetic product and sent the data to the cosmetic product mixer.

Mixing may be carried out according to the method of the first aspect.

In an eighth aspect there is provided a cosmetic product mixer for producing a cosmetic product. The cosmetic product mixer comprises, means to receive first data indicative of a biometric measurement of the user, a plurality of reservoirs, each comprising an ingredient, a mixer, configured to mix a plurality of ingredients to produce a cosmetic product, one or more pumps configured to pump the ingredients from the reservoirs to the mixer, a dispenser configured to dispense the cosmetic product, and a processor configured to control the one or more pumps and mixer, and further configured to cause the one or more pumps to pump the plurality of ingredients to the mixer based on the first data, and to cause the mixer to mix the ingredients to form the cosmetic product.

The reservoirs may be removable or replaceable.

Mixing the plurality of ingredients to produce a cosmetic product may comprise emulsifying the cosmetic product during mixing.

The cosmetic product may be a colour cosmetic, haircare product, skincare product, deodorant or perfume. For example, as described above, the cosmetic product may be a coloured cosmetics product, such as a foundation, lipstick, lip gloss, lip tint, concealer, nail lacquer/polish, for example. The coloured cosmetic product may also be a hair colourant.

The biometric measurement may comprise any physical characteristic of the user. For biometric measurement may comprise any of a measurement of the colour of the user's skin, colour of the user's hair, skin moisture level, skin sebum level, etc. The first data may encode CIELAB values which correspond to the colour of the user's skin, for example.

The processor may process the first data to generate data indicative of a recipe of a cosmetic product. Alternatively, the first data may comprise data indicative of a recipe of a cosmetic product, where the data indicative of a recipe of a cosmetic product is based on a biometric measurement of the user.

The means to receive the first data may comprise a user interface.

For example, the user interface may be a touchscreen or keyboard in which a user can input the first data. For example, the first data may be a hex-code that the user inputs.

The means to receive the first data may comprise a transceiver.

For example, the transceiver may be connected to a network such as the internet, and may receive the first data over the internet.

The processing module may be configured to generate second data based at least on the first data, the second data indicative of a recipe for the cosmetic product.

For example, the first data received at the cosmetic product mixer may be data indicative of the colour of a user's skin. The processor may generate a recipe for the cosmetic product based on the first data, such that the cosmetic product matches the user's skin, for example. Alternatively, the first data received by the cosmetic product mixer may be data indicative of a recipe for the cosmetic product. For example, a server may have already generated the data indicative of a recipe for the cosmetic product and sent the data to the cosmetic product mixer.

The mixer may comprise any one of a static mixer, a Venturi mixer, or a rotating funnel mixer. Alternatively, mixing may be carried out according to the method of the first aspect. That is, the mixer may be a magnetic stirrer.

The one or more pumps may comprise a plurality of pumps, where each pump is associated with an individual reservoir and is configured to pump the ingredient from said associated reservoir.

The one or more pumps may be peristaltic pumps.

The cosmetic product mixer may further comprise means for connecting to a mains water supply.

The server and any of the described cosmetic product mixers or formulating apparatus may form a system. For example, in a ninth aspect there is provided a sever comprising the server of the fourth aspect and the cosmetic product mixer of the fifth aspect. The system may comprise further components, such as a user device. The user device may provide the first data to the server, for example as described in the detailed description.

In any aspect of the invention above, the ingredients may be in the form of pure substances, solutions or suspensions of a single substance within a fluid or solutions or suspensions of multiple substances within a fluid. Generally, any substance suitable for the formation of cosmetic products may be considered to be an ingredient. Classes of ingredients include, but are not limited to, pigments (e.g. titanium dioxide, iron oxides, ultramarine, bismuth oxychloride), carriers (e.g. dimethicone, isododecane, dicaprylyl carbonate), film formers (e.g. dimethicone and trimethylsiloxysilicate, and acrylates/dimethicone copolymer+cyclopentasiloxane), preservatives (e.g. caprylyl glycol, phenoxyethanol, propylene glycol, and iodopropynyl butylcarbamate), emulsifiers (e.g. PEG-7 dimethicone and polyglyceryl-3 diisostearate), silicone phase thickeners (e.g. disteardimonium hectorite, dicapylyl carbonate, propylene carbonate) and water phase thickeners (e.g. sodium polyacrylate, dicaprylyl carbonate, polyglyceryl-3 caprate, sorbitan trioleate).

In any aspect of the invention above, the cosmetic product may be a colour cosmetic, haircare product, skincare product, deodorant or perfume.

Any of the cosmetic product mixers may have a dimension of about wide, deep, and/or high. That is, the cosmetic product mixers are configured to be relatively small when compared with industrial cosmetic product mixers.

Optional features of different aspects may be combined where appropriate.

The terms, first data, second data, third data and fourth data are used to differentiate between different data, and are not representative of an ordering.

While the terms cosmetic product mixer and formulating apparatus have been used, it will be understood that the cosmetic product mixer and formulating apparatus may refer to the same entity.

BRIEF DESCRIPTION OF DRAWINGS

Embodiments of the invention will now be described, by way of example, with reference to the accompanying drawings, in which.

DETAILED DESCRIPTION

The colour of an individual's skin is unique. It is a product of many genetic and environmental factors and changes regularly due to changes in environmental conditions such as sunlight or the seasons. The colour of an individual's skin may be referred to as either skin colour or skin tone. Skin tone is often referred to having two main components, light/darkness (typically described in the Fitzpatrick scale) and undertone, which is the yellow (warm)/red (cool) characteristic of the skin.

When choosing colour cosmetics, an individual's skin tone is particularly important as users are attempting either to find products to match their skin tone i.e. be the same colour or find cosmetics which complement their tone for example for lipsticks, eyeshadow, blusher and other colour cosmetics.

Accurately determining a match to a user's skin tone is a difficult task, not only are there many possible colours and therefore a limit to amount of time a user can test by trial and error various products but also the light source with which a user attempts to determine their skin tone can produce inaccurate results. This is primarily due to a phenomenon known as a metamerism whereby colours look different under different lighting conditions.

Figure 1:
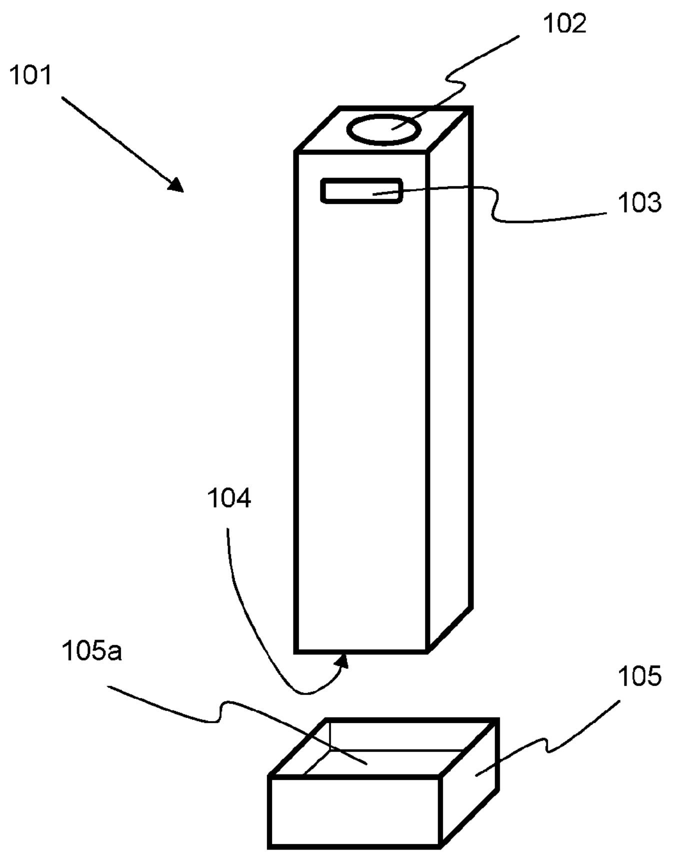
FIG. 1 shows a perspective view of an imaging device according to the present disclosure.

FIG. 1 shows a perspective view of an imaging device 101 which is used to measure a biometric measurement of a user. In an implementation, the imaging device 101 is used to determine data indicative of the colour of a user's skin. Advantageously, the imaging device 101 is able to calculate a user's skin colour with no effect from ambient light. Examples of an imaging device 101 that may be used are the Pico scanner, or Cube scanner, both of which manufactured by Palette Pty.

The imaging device 101 comprises an activation button 102 which is used by the user to turn on the imaging device 101, and is also used to commence imaging of the user's skin, a charging port 103 which is used to charge a battery (not visible) within the imaging device 101, a sensor surface 104 which is arranged to be pressed against the user's skin during imaging, and a cap 105 for covering the sensor surface 104 when not in use and during calibration of the imaging device 101. The cap 105 features a calibrating surface **105*a*, located on an inner surface of the cap 105. The calibrating surface 105*a*** will be described in further detail below.

Figure 2:
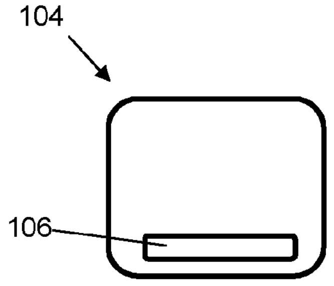
FIG. 2 shows a sensor surface of the imaging device of FIG. 1.
Figure 3:
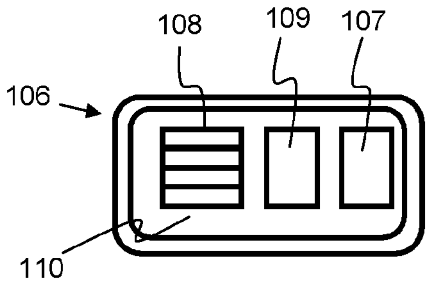
FIG. 3 shows an enlarged view of a portion of the sensor surface of FIG. 2.

A front view of the sensor surface 104 is shown in FIG. 2, which shows an aperture 106 which defines a recessed housing in the sensor surface 104. An enlarged view of the aperture 106 is shown in FIG. 3. A light source 107, a light sensor 108 and a processing module 109 are disposed within the recessed housing. In an implementation, such as when using the Pico sensor, the light source 107 comprises three LEDs, where the colour emitted by each of the LEDs may be red, green and blue, and the light sensor 108 comprises four photo-diodes, where each photo-diode is a red photo-diode, green photo-diode, blue photo-diode and multi-colour photo-diode. The processing module 109 may comprise a processor and memory for controlling the imaging device 101.

The imaging device 101 also comprises a communications module (not shown) configured to connect to an external device, such as a user device 201 or server 301 described below. The communications module may comprise, for example, an LPWAN transceiver or Bluetooth transceiver. Other communication protocols may also be used.

During imaging of the skin, as described in more detail below, the sensor surface 104 is pressed against a portion of the user's skin and each of the LEDs 107 are energised in turn so as to emit light of different wavelengths onto the skin. The light sensor 108 is arranged to receive the reflected light from the skin. Values representative of the reflected light recorded at the light sensor 108 therefore provide an indication as to the colour of the user's skin. The values representative of the reflected light recorded at the light sensor 108 may be converted into CIELAB values, L*, a*, and b*, where L* is for the lightness and a* and b* for the green-red and blue-yellow colour components respectively. The colour value is indicative of the user's skin tone, and can thus be used to compare and match against colours from fan decks, colour standards or cosmetic colours, or can be used as the basis for custom manufacturing cosmetic colours to match the skin tone. As the sensing surface 104 is pressed against the user's skin, ambient light from the environment is preventing from landing on the light sensor 108. That is, the only light landing on the light sensor 108 is light reflected off the user's skin, said light originating from the light source 107.

Imaging of the skin presents a number of technical challenges. In particular, it can be difficult to determine colour values measured from skin by illuminating the skin and analysing the reflected signal. For example, it may be found that some imaging devices do not accurately measure the colour of a user's skin. For example, when using a particular imaging device which is configured to image paint to obtain CIELAB values of the colour of a user's skin, a subsequent cosmetic product made to match the obtained CIELAB values may not, when applied to the user, visually match the colour of the user's skin. This is due, in part, to the fact that skin is translucent, and certain wavelengths of light penetrate further into the skin compared with others.

Depending on the type of imaging device used, some form of correction to the outputted values may need to be applied. The correction may be applied using an algorithm containing one or more correcting factors, e.g. that correct the CIELAB values obtained from the imaging device. The correcting factors may be determined empirically. For example, cosmetic products may be mixed to match a number of different user's skin. Measurements may be taken, using the imaging device, of each of the matching cosmetic products and each of the users' skin. A correcting factor may be determined based on the difference between the measurements. For example, a different correcting factor may be applied to each of the L*, a*, and b* values so as to obtain a modified set of values. The modified values, when used to mix a cosmetic product, results in a cosmetic product which more closely matches the user's skin. This process may be applied to different users with different skin colours.

An additional problem with imaging the skin is that skin is not a flat surface, and curvature of the skin can affect how light is reflected from the surface. In an implementation, the sensor surface 104 comprises a transparent film arranged 110 over the aperture 106.

The film 110 may comprise glass, acrylic, polycarbonate or other high light transmissive polymers. The film 110 forces the user's skin into a flat surface, reducing curvature of the skin, during imaging. Furthermore, the film 110 keeps the light source 107 and light sensor 108 protected from oils or other contaminants present on the user's skin.

In an implementation, the film 110 may have a thickness of less than or equal to 0.3 mm, and have an anti-reflective coating which allows light transmission of more than 97% and light reflectance of more than 1%.

In an alternative implementation, the film 110 may have a thickness of up to 100 microns and may be comprised of polypropylene or other polyolefin with light transmission of more 97% and light reflectance of more than 1%.

Figure 4:
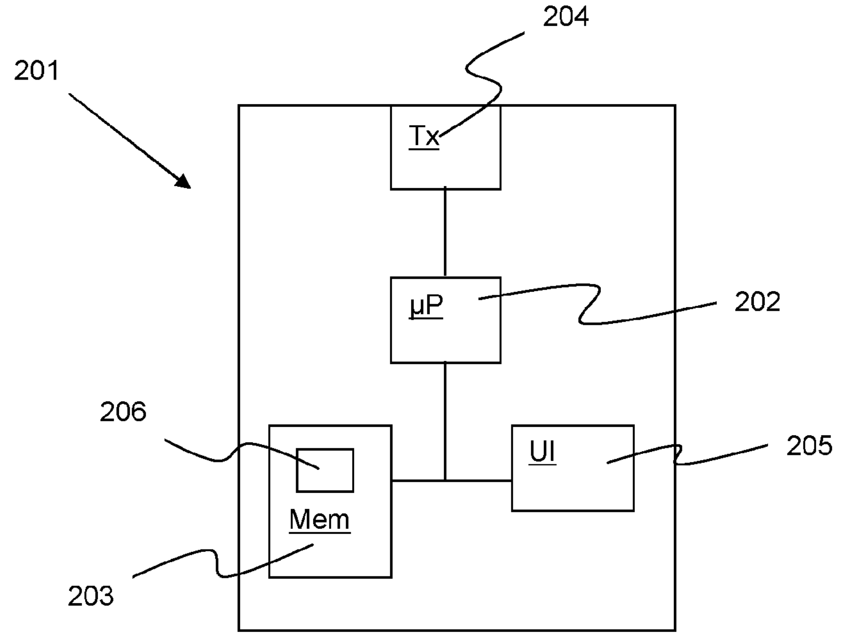
FIG. 4 shows a schematic diagram of a user device according to the present disclosure.

FIG. 4 shows a schematic diagram of the user device 201. In the described implementation the user device 201 is a mobile phone, but it will be appreciated that the user device may be a laptop, tablet, PDA, PC, smart watch, or other user device capable of processing computer data.

The user device 201 comprises a processor 202, a memory 203, a transceiver 204 and a user interface 205, such as a touchscreen. The memory stores a computer program 206, such as an app, which can be used in conjunction with the imaging device 101. The transceiver 204 provides connectivity to the imaging device 101 and to a server 301. The app 206 may allow the user to register with a service for providing customised cosmetic products. The service may provide the server 301 with which the app 206 may connect to so as to upload data from the user device 201 to the server 301. The app 206 may connect to the server 301, using the transceiver 204, over any suitable network, such as the internet.

Figure 5:
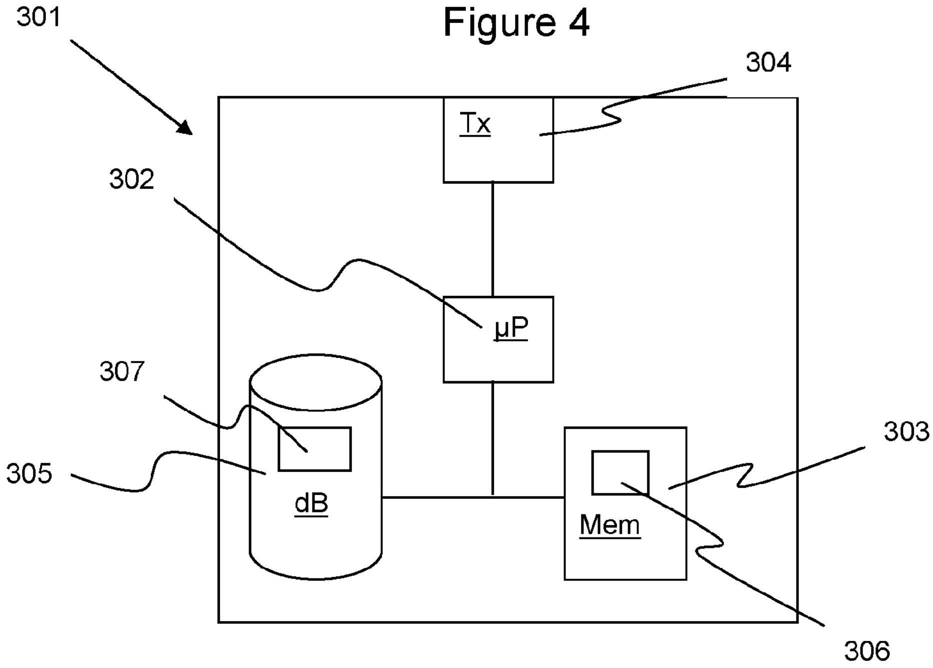
FIG. 5 shows a schematic diagram of a server according to the present disclosure.

FIG. 5 shows a schematic diagram of the server 301. The server 301 comprises a processor 302, a memory 303, a transceiver 304 and a database 305. The memory 303 stores a computer program 306, which when executed by the processor 302, causes the server 301 to carry out one or more methods of the present disclosure. The database 305 comprises one or more user accounts 307, and data relating to a plurality of cosmetic product mixers 401. For each user that is registered with the service, there is a corresponding user account. Each user account 307 comprises details of the user such as the user's name and address and may comprise data indicative of physical features of the user. Each user account 307 may also comprise location information relating to the user, such as the user's address, and/or a preferred location for collecting a cosmetic product.

The server 301 is configured to receive biometric data of the user. In an implementation, such data may be indicative of the colour of a user's skin, such as CIELAB values. The server 301 determines a recipe (mixture of ingredients and relative qualities) such that a cosmetic product made to the recipe has the same CIELAB values as the user's skin, e.g. matches the user's skin. The determination of the recipe may be determined using a model. For example, the model may be based on a database which correlates recipes with CIELAB values. The database may be built by developing many different formulations of a given cosmetic product, each formulation having different ratios of ingredients, and taking a measurement of each of the formulations' CIELAB values. The measurement of each of the formulations' CIELAB values may be taken using the imaging device 101. A model, such as an algorithm, can then be created based on the data in the database and used to predict a recipe which will have a matching CIELAB value to a user's skin CIELAB value. Machine learning may be used in developing the model. For example, a trained neural network may be used to predict ingredients (and quantities or ratios of said ingredients) based on a desired colour.

Figure 6:
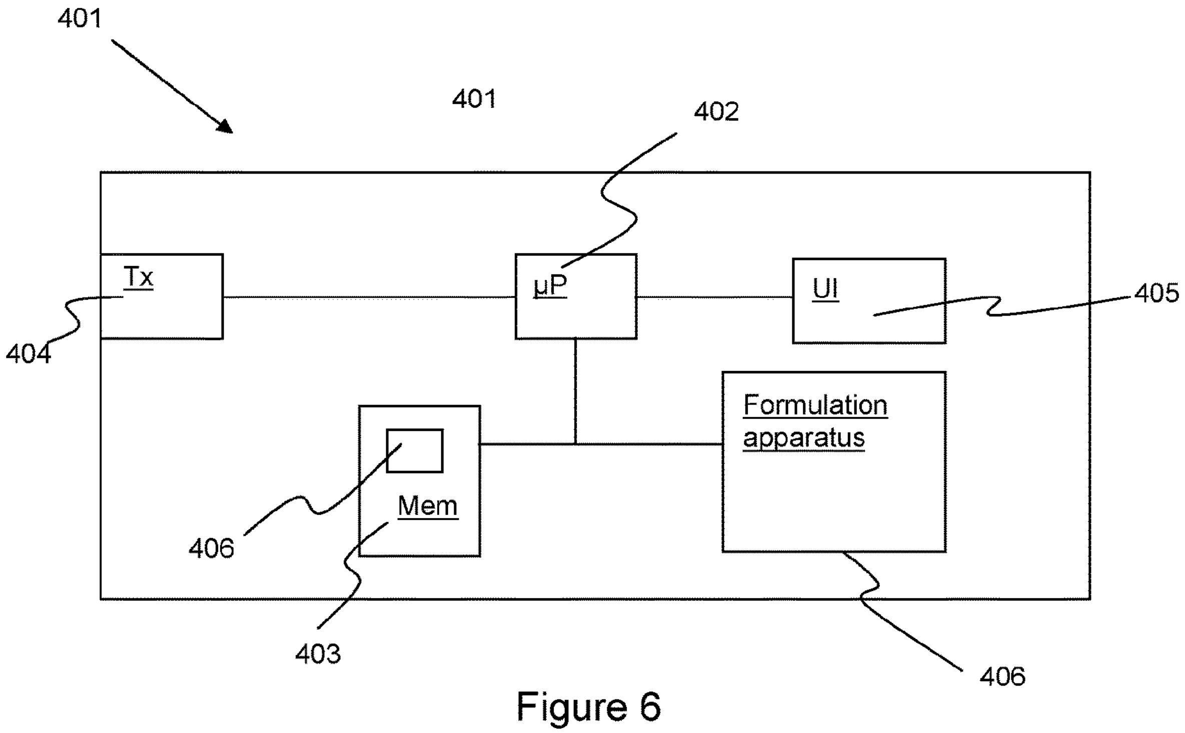
FIG. 6 shows a schematic diagram of a cosmetic product mixer according to the present disclosure.

FIG. 6 shows a schematic diagram of a cosmetic product mixer 401. The cosmetic product mixer 401 is configured to mix ingredients to form a customised cosmetic product. The cosmetic product mixer 401 comprises a processor 402, a memory 403, a transceiver 404, a user interface 405 and a formulation apparatus 406. The memory 403 stores a computer program 407, which when executed by the processor 402, causes the cosmetic product mixer 401 to carry out a method of the present disclosure.

A cosmetic product typically includes a bulk material, which can be defined as a material making up to more than 50% of the formulation, either weight or volume, or a material having the highest proportion of the total formulation. For example, in a typical liquid foundation the product may comprise the following:

- Water may make up to more than 50-90% of the formulation;
- Colourings made up of an emulsifier/pigment/emollient blend may make up to 5-50% of the formulation, where the following are examples of ingredients that may be in the blend:
  - Emulsifiers—PPG/PEG/silicone co-polymer emulsifiers or sometimes called silicone co-polyols. These allow the creation of w/si and si/w emulsions. These silicone emulsifiers contain at least 1 water soluble group (e.g. PEG) and 1 silicone soluble group (e.g. dimethicone). Emulsifiers containing 2 water soluble groups show enhanced stability and emulsifying capabilities.
  - Emollients—these include, as examples:
    - Cyclopentasiloxane
    - Dimethicone
    - Isododecane
    - Phenyltrimethicone
    - C12-15 Alcohol Benzoate
    - Isononyl Isononanoate
  - Pigments, for example:
    - White—using titanium dioxide or zinc oxide;
    - Black—using iron oxide
    - Red—using iron oxide
    - Yellow—using iron oxide
    - Blue—using ultramarine
  - Effect pigments, for example
    - mica, Boron Nitride, Bismuth Oxychloride
  - Emulsion stabilizers, for example:
    - Disteardimonium Hectorite, Polyethylene, carbomer, fumed Silica, Silica Silylate, Sodium Chloride, Magnesium Sulfate, polyacrylate
  - Preservatives, for example:
    - Phenoxyethanol, Benzyl alcohol, Caprylyl Glycol, Ethylhexyl Glycerin, Hexanediol, Disodium EDTA
- Active ingredients may make up 1-10% of the formulation, where the following are examples of active ingredients:
  - Humectant/moisturisers (making up to 1-10% of the formulation)
    - Glycerin, butylene glycol, propendiol, sodium hylarounate
  - Actives (making up to 1-5% of the formulation)
    - Peptides, vitamins, stem cell extracts
  - UV protection (making up to 1-5% of the formulation)
    - butyl methoxydibenzoylmethane (BM BM), ethylhexyl methoxycinnamate (EHMC), octocrylene (OCT)
  - Skin feel adjusters/emollients.

The cosmetic product mixer 401 is configured to be relatively small when compared with industrial mixers, such that it may be located in areas where space is limited, such as shop floors, cafes, bars, sports centres, etc. For example, the cosmetic product mixer 401 may have dimensions in the region of ≥2 m wide, ≥2 m deep, ≥2 m high. That is, the cosmetic product mixer 401 may be similar in size or volume to a typical vending machine, and is relatively small when compared with industrial mixers used in factories that manufacture cosmetic products.

Figure 7:
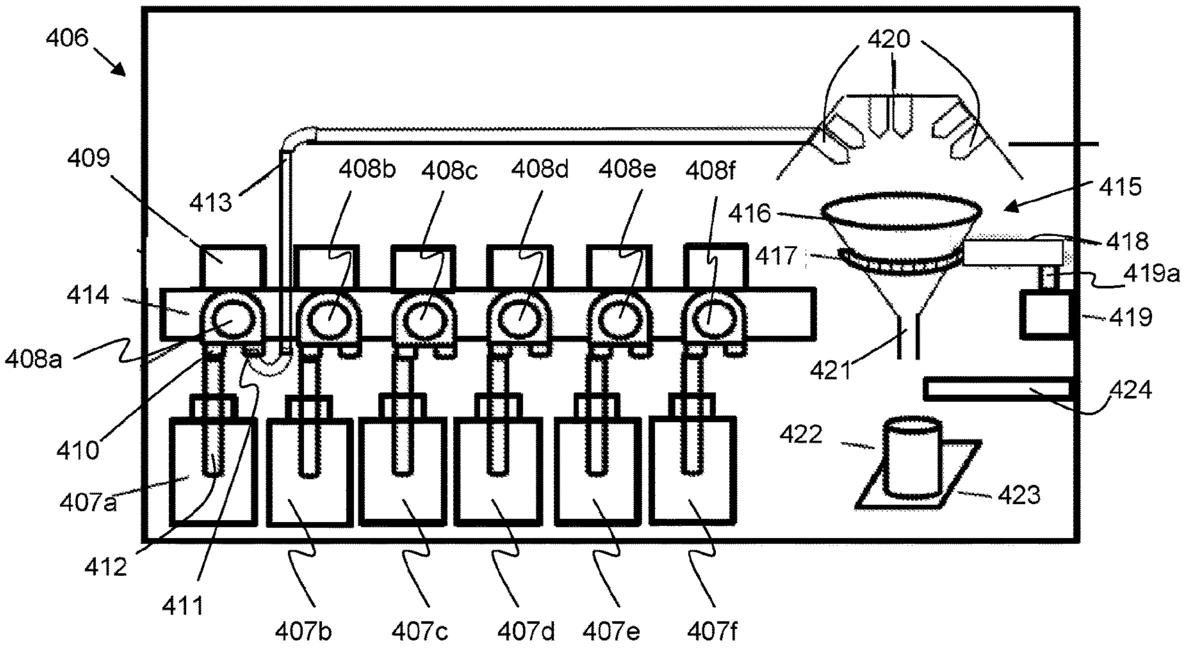
FIG. 7 shows a schematic diagram of a formulating apparatus of the cosmetic product mixer of FIG. 6.

FIG. 7 shows a schematic view of the formulation apparatus 406. The formulation apparatus 406 comprises a plurality of reservoirs 407*a*, 407*b*, . . . 407*f* for storing component ingredients in a fluid form for a cosmetic product in an inventory section. Six reservoirs are shown in the schematic diagram of FIG. 7, but it will be appreciated that more or less reservoirs may be used. The reservoirs 407 are configured to be removable such that individual reservoirs may be removed and replaced. For example, when one of the reservoirs has become empty a new pre-filled reservoir may be installed. The reservoirs 407 are made from a material which is compatible with the ingredients to be stored within the reservoirs 407. An example material may be a plastic material, PET, HDPE, PP, PVC, ACRYLIC, or PLA. Additionally foil pouches or aluminium containers may be used.

Each reservoir 407 may be labelled with an RFID, barcode, QR code or other machine readable code which encodes data indicative of the component ingredient stored within the reservoir 407. The machine readable code may be read by a scanner (not shown) of the cosmetic product mixer 401 and the data indicative of the ingredient stored within the reservoir 407 may be stored in the memory 403 of the cosmetic product mixer 401 and/or transmitted to the server 301 using the transceiver 404. The data indicative of the ingredient stored within the reservoir may comprise details such as a specification, weight/volume and other information about the ingredient.

Each reservoir 407 may contain a different ingredient, where the specific ingredients are provided depend on what type of cosmetic product the cosmetic product mixer is configured to produce. For example, in order for the cosmetic product mixer 401 to produce a liquid based foundation having a specific colour, there may be a reservoir 407 of water, four reservoirs 407 of an emulsifier/pigment/emollient blend, one of each reservoir having a colour of red yellow black and white, and one or more additional reservoirs 407 containing active ingredients such as moisturisers, skin feel adjusters, preservative, etc. Each emulsifier/pigment/emollient blend is premixed with one or more coloured pigments to create four colours, red, yellow, white, black, with each coloured ingredient occupying one of the four reservoirs. The pigments can include iron oxides, titanium dioxide, zinc oxide, micas and other metal inorganic pigments, dyes or lakes.

The reservoirs 407 may have the same, or differing, volumes. For example, if an ingredient is typically used more often than another ingredient, the reservoir holding the ingredient which is used more often may be larger than the other reservoirs so as to hold a larger volume of the ingredient.

For each of the plurality of reservoirs, there are a plurality of pumps 408*a*, 408*b*, . . . 408*f*. Each pump 408 is driven by a motor 409 (only one of the motors is labelled in FIG. 7 for clarity). In an implementation the motors 409 are stepper motors. The pumps 408 and motors 409 are fixed on a gantry support 414 such that the pumps 408 are located above their respective reservoir 407. Each pump 408 has an inlet 410 and an outlet 411 (only the inlet and outlet of pump 408*a* is labelled in FIG. 7). The inlet 410 is connected via an inlet tube 412 to the pump's respective reservoir 407 for drawing fluid from the reservoir 407 to the pump 408. The outlet 411 is connected via an outlet tube 413 to a mixer 415 for pumping fluid from the pump 408 to the mixer 415 (only one outlet tube 413 is shown for clarity in FIG. 7). The inlet tubes 412 and outlet tubes 413 are made from cosmetic grade or compatible materials such as silicone, silicone elastomer, non-phthalate plasticised PVC, PFTE, or Fluoropolymer (Viton Tubing). Typically grades produced for the pharmaceutical industry may also be used. The inlet tubes 412 and outlet tubes 413 may be configured to be easily replaced for maintenance. For example, the inlet 412 and outlet 413 tubes may connect to the pump 408 using barbed adapters. Luer locks help secure the piping to the pump 408 in a way that prevents any leakage but which can be easily removed for maintenance.

However, other securing means may be used, such as barbed adapters and pre-molded connectors.

In an implementation the pumps 408 are peristaltic pumps. Peristaltic pumps are advantageous in that they do not come into contact with the ingredient being pumped, but instead squeeze an outer layer of tubing containing the ingredient. This reduces potential contamination of the ingredients, and of the end cosmetic product.

Peristaltic pumps are further advantageous in that they can pump precise volumes of fluid due to their design. It is therefore possible for the processor 402 to calculate the total volume of fluid dispensed over time and to know how much of each ingredient remains in each reservoir 407. When a given reservoir is low, the processor 402 may produce an output, either to the server 301 or on the user interface 405 to alert a user that the reservoir 407 needs replacing or refiling. Further advantages of peristaltic pumps are that they are self-priming, and are able to fully eject the liquid contained within the pump 408. Additionally, the physical space occupied by peristaltic pumps is relatively low when compared with other types of pumps.

The pumps 408 and associated motors 409 may have different power ratings relative to one another depending on characteristics of the ingredient to be pumped by a given motor, such as the ingredient's viscosity, or on the amount of ingredient the given motor will pump. Different tube sizes for the inlet and outlet tubes 412, 413 may also be used depending on the ingredient to be pumped. For example, bulk ingredients, such as those that make up typically over 50% of the weight or volume of the cosmetic product, may be pumped using higher powered motors with wider tubing to create a faster pumping profile, since bulk ingredients are used in greater quantity than other ingredients.

The pumps 408 and associated motors 409 may be configured to provide a reverse flow in order to drawback remaining fluid from the outlet tube 413. The pump 408 may draw back the fluid so as to keep the fluid meniscus in a predetermined place within the outlet tube 413. By drawing the fluid back, the cosmetic product mixer 401 knows where the fluid is in the tube, improving accuracy when delivering the fluid at a later time. Additionally, it helps prevent dripping, as once the meniscus is within the tube 413 air pressure helps keep it in position for longer. If the pumping stops without the drawback there is a reliance on surface tension to hold the fluid in place within the tube 413. If the surface tension fails an uncontrolled volume is dropped from the tube 413 and the exact position of the meniscus is not completely known.

While peristaltic pumps have been described, it will be appreciated that other pumps could be used, such as syringe pumps.

The mixer 415 is arranged to mix ingredients received from the reservoirs. As the ingredients are mixed they may be emulsified by the mixer.

In the implementation shown in FIG. 7, a rotating funnel mixer is shown, where the ingredients are pumped via outlet nozzles 420 onto a surface of a mixing funnel 416 which is configured to be rotated as the ingredients are pumped onto the mixing funnel 416. The mixing funnel 416 may be rotated at 50-500 rpm, depending on the ingredients being mixed. Rotation of the mixing funnel 416 is provided by rotation means. In an implementation the rotation means comprises a motor 419. A first gear 417 is circumferentially arrange about an outer surface of the mixing funnel 416, the first gear 417 configured to engage a second gear 418 which is coupled to the motor 419 via a drive shaft 419*a*. In this way, rotation provided by the motor 419 is transferred via the first and second gears 417, 418 to the mixing funnel 416. It will be appreciated that any suitable means may be used for causing the mixing funnel 416 to rotate.

The bulk ingredient, such as water, may be dispensed first onto the mixing funnel 416 so as to coat the inside of the mixing funnel 416 with a film of the bulk material. Additional ingredients, such as pigments, are then dispensed simultaneously with the bulk ingredient onto the surface of the mixing funnel so as to equally distribute them within the bulk fluid film on the mixing funnel 416. The additional ingredients may be dispensed in a dropwise pattern. Dispensing the additional ingredients onto the mixing funnel 416 as the mixing funnel 416 rotates in a dropwise pattern helps to distribute the ingredients with smaller inclusion levels equally within the bulk fluid and facilitates their mixing with the bulk fluid. Furthermore, rotation of the mixing funnel creates a centrifugal force and shear on the fluid sitting on it, helping to mix the fluid. As the ingredients are being mixed, they slide down the surface of the mixing funnel 416 due to the action of gravity, where they leave the mixing funnel via a dispensing nozzle 421. The product may thicken/stabilise after it has left the dispensing nozzle 421, e.g. once it has entered a container 422.

Such a method of mixing differs from typical industrial mixing practices in that all the ingredients are added simultaneously together in their appropriate ratios. This can lead to lower energy consumption when mixing to emulsify and stabilise the product than would otherwise be required in an industrial setup.

The mixing funnel 416 may comprise a low friction coating and can additionally be coated with hydrophobic or lipophobic coatings depending on the ingredients to be mixed. The mixer 415, or parts of the mixer 415 such as the mixing funnel 416, may also be configured to be removable for cleaning or replacement.

The cosmetic product mixer 401 may comprise one or more additional or alternative mixers 415.

Figure 8:
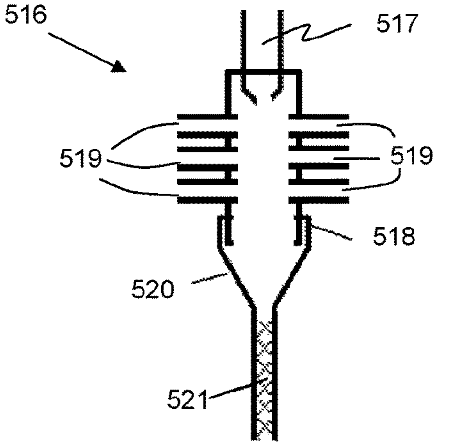
FIG. 8 shows a schematic diagram of a static mixer.

For example a static mixer may be used. A static mixer may be particularly useful for fluids where homogeneous mixing and/or emulsification is required. Static mixers use baffles to cause mixing of fluid as the fluid is forced passed the baffles, and can be particularly effective when combining immiscible liquids or to emulsify oils and water based fluids. FIG. 8 shows a schematic illustration of a static mixer 516. The static mixer 516 comprises a main inlet tube 517 for dispensing the bulk ingredient into a manifold 518 of the mixer 516. A plurality of additional inlet tubes 519 are provided for dispensing the additional ingredients into the manifold 518. The manifold 518 comprises an outlet tube 520 which connects to a static mixer comprises baffles 521. After the fluid has travelled past the baffles it is directed towards a dispensing nozzle. The main inlet tube and outlet tube 520 are arranged in line with each other, with the additional inlet tubes 519 arranged generally perpendicular to the main inlet tube 517. This arrangement helps further mix the ingredients prior to entering the static mixer 516. The outlet tube 520 may be detachable from the manifold 518. The additional inlet tubes 519 may have a diameter less than the main inlet tube 517.

Another example of a mixer 415 that may be used is a Venturi mixer 616. When using a Venturi mixer, mixing of the fluid may take place using a compressed air jet. An advantage of using compressed air is that the ingredients are finely dispersed creating small droplet sizes which are ideal for mixing. Additionally the turbulence created by the airflow aids the mixing process additionally. A Venturi mixer is particularly useful when mixing low viscosity formulations.

Figure 9:
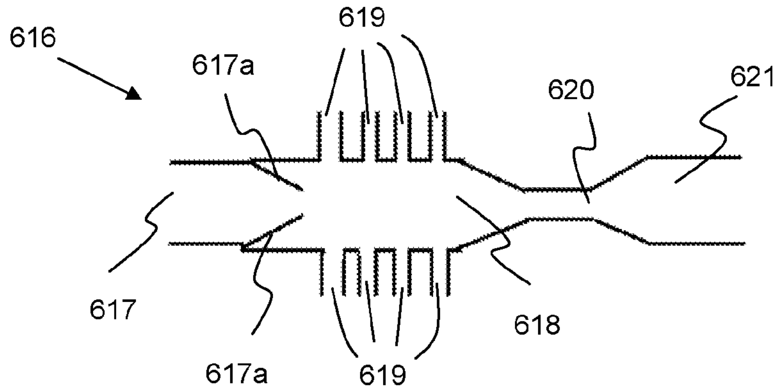
FIG. 9 shows a schematic diagram of a Venturi mixer.

FIG. 9 shows a schematic illustration of a Venturi mixer 616. The Venturi mixer 616 comprises a main inlet tube 617 for supplying a compressed gas into a manifold 618. In an implementation, rather than using a compressed gas, the bulk ingredient of the particular cosmetic product being mixed may be delivered compressed via the main inlet tube 417. A plurality of ingredient inlet tubes 619 are provided for dispensing ingredients of the cosmetic product into the manifold 618. The manifold 618 comprises a diffuser 620 which connects to a dispensing outlet 621 for dispensing the mixed cosmetic product. The main inlet tube 617 and diffuser 620 are arranged generally in line with each other, with the ingredient inlet tubes 619 arranged generally perpendicular to the main inlet tube 617. The diameter of the ingredient inlet tubes may differ from one another depending on the type/amount of ingredient to be pumped, e.g. bulk or additional ingredient. The main inlet 617 tapers 617*a* so as to become narrower in diameter as it enters the manifold 618 so as to reduce the fluid pressure of the compressed air via the Venturi effect. As the air flows past the inlet tubes 619, a pressure difference between the air and the ingredients within the inlet tubes 619 pulls the ingredients from the inlet tubes 619, helping them to mix together within the manifold 618 and diffuser 620 before entering the dispensing outlet 621.

Once the ingredients have been mixed in the mixer 415 to produce a cosmetic product, the cosmetic product is dispensed. In an implementation, the mixed product is dispensed from a dispensing nozzle 421 into a container 422. The cosmetic product may be dispensed such that it continues to emulsify in the container 422 on dispensation. The mixed product can additionally be mixed further by simply shaking the container 422 after dispensing. Additionally a metal ball may be placed in the container 422 to aid mixing when shaking the container.

Figure 12:
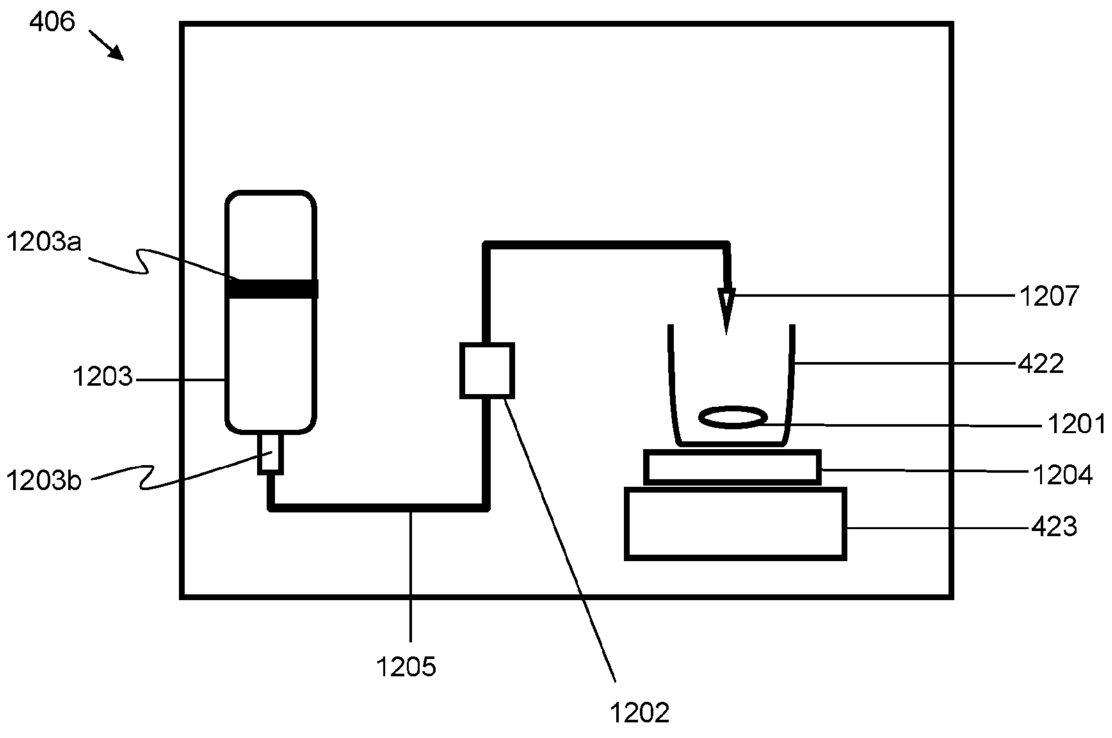
FIG. 12 shows an alternative schematic diagram of a formulating apparatus of the cosmetic product mixer of FIG. 6.

In an alternative embodiment shown in FIG. 12, the pump is a peristaltic pump 1202 and the reservoir is a low friction plunger cartridge 1203. Although depicted as vertical here with the plunger 1203*a* above the dispense point 1203*b* of the cartridge 1203, the low friction plunger cartridge 1203 may be positioned in any orientation. A dip tube is not required and instead a single tube 1205 runs from the dispense point 1203*b* of the low friction plunger cartridge 1203 to a dispense tip 1207, which is typically made of steel, via the peristaltic pump 1202. The peristaltic pump 1202 acts on an outer surface of the tube 1205, while not requiring that the tube 1205 be physically separated at any point. That is, a single piece of tube 1205 may provide uninterrupted fluid communication between the dispense point 1203*b* and the dispense tip 1207. The dispense tip 1207 is easily cleaned and may be immersed in liquid or capped between uses to prevent drying out of fluid within the tube 413. One low friction plunger cartridge, peristaltic pump and dispense tip is depicted here for clarity, however, it will be understood that multiple low friction plunger cartridges 1203, each with their own tube 1205, may be present. Multiple tubes may feed through a single peristaltic pump, dispensing from each tube limited by valves (not shown). Alternatively, each tube 1205 may have a dedicated peristaltic pump 1202. In a further variant, the dispense tip 1207 is a manifold nozzle with channels for each ingredient.

In this embodiment, the ingredients are dispensed directly into the vessel 422 (e.g. container), which holds a magnetic stirrer bar 1201. The magnetic stirrer bar 1201 may have any suitable form or shape to facilitate mixing of ingredients, such as an elongate bar. The magnetic stirrer bar 1201 may comprise any suitable material capable of reacting to an electromagnetic field as is well known in the art. The magnetic stirrer bar 1201 may be coated with PTFE so as to ensure inert effect on the ingredients being mixed.

The magnetic stirrer bar 1201 is activated by a rotating magnetic field. In the implementation shown, a magnetic stirrer 1204 generates the rotating magnetic field. Any suitable magnets may be used. In a preferred implementation, neodymium magnets are used. The stirrer bar 1201 is rotated with the magnetic field and acts to stir the ingredients which have been dispensed into the vessel 422 to form the intermediate. In the example shown in FIG. 12, the magnetic stirrer 1204 is located underneath the vessel 422. The extent of mixing of the ingredients may be monitored by one or more sensors. Alternatively, the time required to obtain sufficient mixing may be estimated based on data relating to the ingredients that are to be mixed (e.g. their viscosities and relative quantities). Once the intermediate is observed or estimated to be well-mixed the stirrer bar 1201 is stopped and/or the final ingredient is added (depending on the recipe for the cosmetic product) to increase the viscosity of the intermediate and form the cosmetic product. The magnetic stirrer bar 1201 may be left within the vessel 422. This allows a user to optionally remix or merely agitate the ingredients at a later date. Alternatively, the magnetic stirrer bar 1201 may be removed, such as by passing the vessel 422 through a magnetic field which removes the magnetic stirrer bar 422 through the aperture in the vessel 422.

The rotating magnetic field generated by the magnetic stirrer 1204 may be generated in any suitable way. For example, the magnetic stirrer 1204 may comprise a magnet configured to be rotated by, for example, a motor such as a DC motor. Alternatively, the rotating magnetic field may be generated by one or more electromagnets.

While shown as being located underneath the vessel 422, the magnetic mixer 1204 may be located laterally with respect to the vessel 422 (e.g. vertically in the frame of reference of FIG. 12). This arrangement may be used in order to generate vertical mixing of the product, where the magnetic stirrer bar 1201 is also arranged laterally with respect to the vessel 422.

In alternative implementations, the magnetic stirrer bar 1201 may move laterally through the vessel 422. For example, the magnetic stirrer bar 1201 may be caused to rotate about an axis of rotation in order to stir the ingredients, and may also be caused to move laterally along (or along a component of) the axis of rotation (vertical in the frame of reference of FIG. 12). In this way, the magnetic stirrer bar 1201 may move gradually through the ingredients to ensure complete mixing throughout the vessel. This may be beneficial for higher viscosity materials, such as materials having a viscosity of <100,000 cps.

The container 422 may be placed in a dispensing area of the cosmetic product mixer 401 prior to dispensing. For example, a user may place the container 422 in the dispensing area prior to instructing the cosmetic product mixer 401, via the user interface 405 for example, to mix the ingredients. The dispensing area may comprise a mass balance system 423. The mass balance system 423 comprises scales onto which the container 422, and magnetic stirrer 1204 if used, is placed ready for receiving the cosmetic product. Alternatively, the mass balance system 423 may be placed between the magnetic stirrer 1204 and the container 422, or the mass balance system 423 and magnetic stirrer 1204 may be a single, multifunctional unit. The scales may comprise a load cell which deforms when weight is applied to the load cell, where deformation of the load cell changes the resistance of the cell, allowing weight to be determined. The mass balance system 423 may be configured to detect when the container 422 has been placed in the dispensing area prior to dispensing the cosmetic product. The mass balance system 423 may also be configured to confirm the correct weight of the dispensed cosmetic product and therefore confirm that the correct volume of cosmetic product has been dispensed.

For example, when the cosmetic product mixer 401 receives a recipe, such as from the server 301, the processor 402 calculates the number of steps for each motor based on the weight of each ingredient to be dispensed. The dispensing begins and the mass balance system 423 is able to track the weight gain as the product is being dispensed.

In the event that the weight data from the mass balance system 423 differs from the assumed weight data, the cosmetic product mixer 401 may generate a warning and stop production. Alternatively the cosmetic product mixer 401 can store the data in the memory 403 over time such that trends like under or over delivery which might be a flag for inspection/service can be logged. Such logging data may periodically be uploaded to the server 301.

The processor 402 can use data from the mass balance system to track the speed of production, for example, based on the rate of change of the weight of the container. For example if the processor 402 determines that the product is being dispensed slower than expected over time or there is a sudden drop in performance it might indicate an issue with one of the pumps 408. If a pump 408 is turning as expected but the dispensing is slower than expected, this could indicate that there is a tubing leak.

In an alternative implementation, rather than dispensing the cosmetic product into a container 422, the cosmetic product mixer 401 may apply the mixed product directly to a person or other item. For example, a Venturi mixer of the type described above may be used to dispense the cosmetic product from the cosmetic product mixer 401 in a fine mist. A user may stand in front of the dispensing outlet 621 such that the product is applied directly to them.

The cosmetic product mixer 401 may further comprise a drip catching tray 424. For example, upon completion of dispensing, the drip catching tray 424 may be extended by an arm (not shown) such that the drip tray 424 is underneath the dispensing nozzle 421 so as to catch any remaining product which may drip from the dispensing nozzle 421.

The cosmetic product mixer 401 may further comprise a UV light source (not shown). For example, a UV-C light may be installed within the dispensing area such that after dispensing has been completed and the container 422 has been removed from the dispensing area, the dispensing area is bathed in UV-C light so as to kill any microbes in the dispensing area. A UV light shield, such as a door, may be used to cover the dispensing area during emitting of the UV-C light so as to prevent UV-C light from leaving the cosmetic product mixer 401.

The transceiver 404 may be capable of connecting to a LAN or WLAN, such as a Wi-Fi or GSM connection point. The transceiver is configured to allow a connection to be established between the cosmetic product mixer 401 and an external computer, such as the server 301. The cosmetic product mixer 401 may receive instructions to mix a cosmetic product from the server 301 via the transceiver 404. The transceiver 404 may also be used to send or push updates from the server 301 to the cosmetic product mixer 401, and for the cosmetic product mixer 401 to send diagnostic information to the server 301. The cosmetic product mixer 401 may further comprise a cable connection interface such as a USB port for local communication. This may be beneficial when a service engineer wants to locally communicate with the cosmetic product mixer 401 during servicing or repairing of the cosmetic product mixer 401.

Water typically makes up a significant portion of a formula of emulsion or water based cosmetic products and water is often the bulk ingredient within such products. In such cases where the cosmetic product mixer 401 mixes water based products, the cosmetic product mixer 401 may further comprise a water source. The water source may comprise a tank or reservoir which can be filed with water prior to mixing. The tank or reservoir may be located internally or externally from the cosmetic product mixer 401. The water source may be a connection to a mains water supply. A connection to a mains water supply is advantageous in that it reduces the size of the cosmetic product mixer 401 as there is no need for the cosmetic product mixer 401 to comprise a water tank.

In an implementation, electrical components of the cosmetic product mixer, such as the processor 402, memory 403, transceiver 404, user interface 405, motors 409, are suspended above any surface where liquid could collect in the event of the leak or are housed in water proof housings. Additionally the cosmetic product mixer 401 may have grills/holes set within a base to avoid leaks being able to pool within the cosmetic product mixer 401.

The cosmetic product mixer 401 may be able to work independent of the server 301. For example, the cosmetic product mixer 401 may offer users a range of pre-determined mixtures which a user can choose via the user interface 405. Selection, by the user, of one of the pre-determined mixes causes the cosmetic product mixer 401 to mix and dispense a product based on the pre-determined mix. Alternatively, the user may enter data into the cosmetic product mixer 401, where the data is indicative of the colour of the user's skin. As an example, the app and/or the imaging device 101 may output a machine readable code to the user, such as a hex code, which identifies the data representative of the colour of the user's skin, such as CIELAB values described above. This allows a user to manually input the hex code into the cosmetic product mixer 401 via the user interface 405. The cosmetic product mixer 401 may be configured to determined, based on the received data, a recipe which would have the same CIELAB values as the user, in a similar manner to that described above with respect to the server 301.

There will now be described an example manufacturing process for creating a shampoo. The shampoo may be created without using the imaging device. For example, a user may request a shampoo having a pre-determined mixture via the user interface 405 at the cosmetic product mixer 401, or remotely via their user device 201 and the server 301.

A concentrated blend of sodium laureth sulfate, betaine (surfactants) is stored in a first reservoir 407. Additional ingredients such as ingredients to improve the feel of the hair, the condition and cosmetic properties of the shampoo (colour/fragrance) are stored in the other reservoirs 407. A concentrated brine (salt water) solution is held in another reservoir 407. A further reservoir 407 of citric acid solution may also be included.

The ingredients are dispensed from the different reservoirs 407, along with water, simultaneously to form a shampoo (the intermediate). Then the brine is added as a further ingredient in order to thicken the shampoo (to form the cosmetic product). Adding the brine after forming the intermediate thickens the shampoo at the end of the production cycle, meaning that the ingredients in the reservoirs can be kept at a low viscosity. This reduces the power required to pump the ingredients to the mixer 415 (or vessel 422). As an alternative to brine, a thickener such as guar or synthetic polymer can be used as the further ingredient.

In some implementations a mixed product may be produced by the cosmetic product mixer 401 using a pre-produced base, such as a ready-made foundation, where only the colour is adjusted rather than creating the product formulation from scratch. For example, two reservoirs may contain the same base foundation, but having differing colours, e.g. one may have a light colour with an L* value of higher than 65, and the other have a dark colour with an L* value of lower than 50. Four reservoirs may contain different coloured pigments, such as dispersions in silicone or oil of titanium dioxide (white) or iron oxide (red) or iron oxide (yellow) or iron oxide (black). Additional reservoirs may contain other ingredients such as active ingredients. Given a user's L* value, a ratio of the two base foundations may be determined based on a model which would match the user's L* value. The a* and b* values of this mixture may also be determined from the model, allowing a determination of what additional pigments to add in order to match the user's a* and b* values. The model may be determined based on empirical data, as described above.

Figure 10:
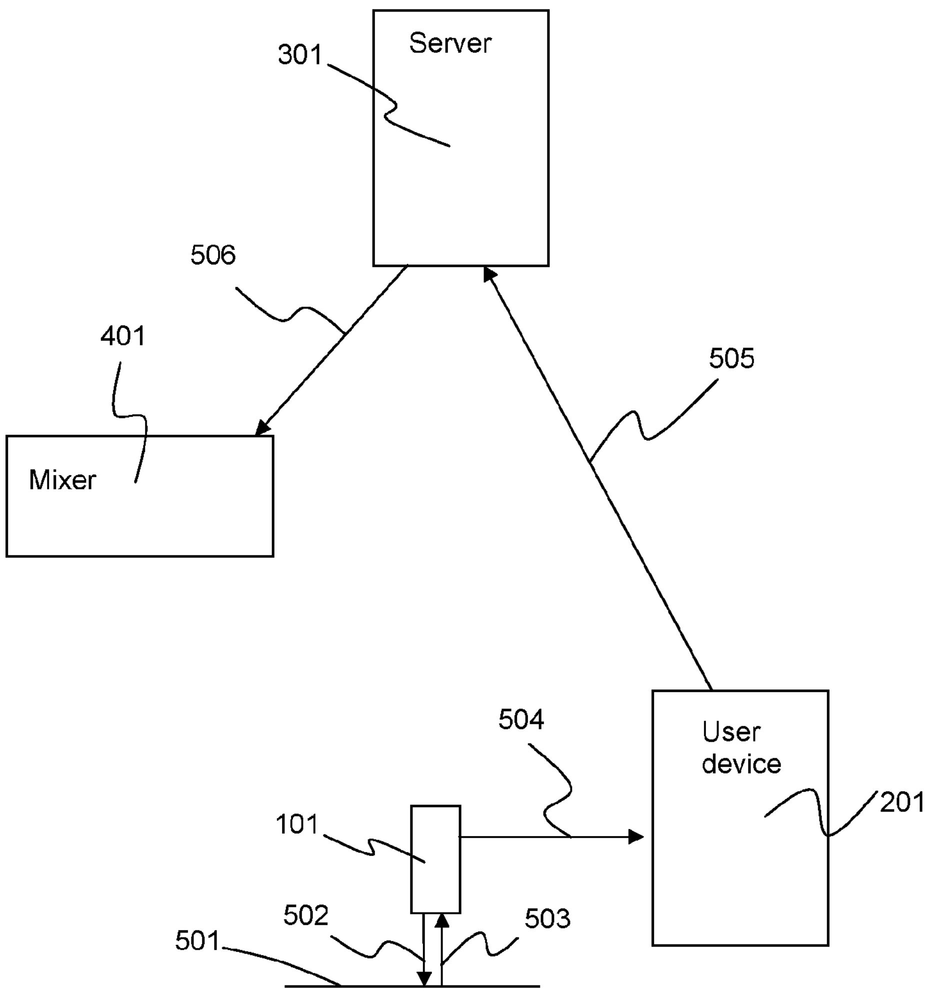
FIG. 10 shows a schematic representation of a method according to the present disclosure.

With reference to FIG. 10, there will now be described a method of using the imaging device 101, user device 201, server 301, and cosmetic product mixer 401 to determine a user's skin tone and prepare a customised cosmetic product. Advantageously, the method does not require the user to be assisted by an expert user.

A user of the imaging device 101 may initially register with the server 301. This may be done by downloading and executing the app 206 on the user's user device 201. Registration may comprise providing the server 301 with details about the user. For example, the details may comprise any of the user's name, location, billing information, and data indicative of one or more physical characteristics of the user.

When the user wishes to order a cosmetic product, the user may use the app 206 to make an order. The app 206 may, for example, show a list of products that the user can choose from. The list of products may be based on, for example, previous products ordered by the user, and/or recommendation based on previous products ordered by the user. The list of products may be based on stored data indicative of a physical characteristic of the user, such as the user's skin tone, hair colour, etc. The data indicative of a physical characteristic of the user may have been entered into the app 206 during registration, or during a previous order, e.g. a user may have previously used the imaging device 101 to determine the colour of their skin, and data relating to the colour was stored.

As well as selecting from a predetermined list of products, the app 206 also provides the user with the option to use the imaging device 101 to determine a colour of the user's skin, and then, based on this determination, have a custom cosmetic product prepared.

When the imaging device 101 is turned on, it may connect via the communications module to the user device 201. The imaging device 101 may perform a calibration routine on start up. During calibration the cap 105 is placed on the imaging device 101 so as to cover the light sensor 107, such that an image taken with the light sensor 107 is of the calibration surface **105*a* of the cap 105. The light source, such as a number of LEDs, 107 are emitted in sequence and the light sensor 108 measures the received signals, having been reflected off the calibration surface 105*a*. Values representing each of the received signals are compared against a database of expected values. For example, the imaging device 101 and/or the app 206 have a database which contains the expected raw data values that should be obtained by imaging the calibration surface 105*a* (the calibration surface 105*a* may be thought of as a greyscale card). Based on the comparison between received and expected values one or more calibration parameters may be determined which are subsequent used to modify the values recorded by the imaging device 101 following calibration. Calibration can reduce the effect temperature has on the imaging device 101**, for example.

Once calibrated, the cap 105 can be removed and the sensor surface 104 of the imaging device 101 can be placed on the user's skin 501 ready for imaging. The user may be prompted by the app 206 on the user device 201 to take an image of one or more locations of the user's skin. The user may then place the sensor surface 104 at one of the particular locations on the skin. Once placed on the user's skin, the user presses the activation button 102 which causes the imaging device 101 to energise each of the LEDs 107 in sequence to emit light 502 and the light sensor 108 measures the received signals 503 which have been reflected off the user's skin. Values representing each of the received signals therefore provide data representative of a colour of the user's skin. Each of the values representing each of the received signals may be modified accordingly based on the calibration parameters. The user may then take further images at different locations on the skin such that an average value relating to the user's skin colour may be determined.

In an implementation, the imaging device 101 outputs an CIELAB value (or averaged CIELAB value if multiple readings are taken), of the user's skin. That is, data indicative of the colour of the user's skin may be an CIELAB value which comprises values for L*, a* and b*.

The data indicative of a colour of the user's skin is transmitted 504 to the app 206 on the user device 201, which transmits 505 the data to the server 301. The data indicative of a colour of the user's skin may be used in a variety of different ways. For example, the data representative of the colour of the user's skin may be matched against existing colours in a database using theoretical colour distances in either the CIELAB (or LCH if used instead of CIELAB) colour models. Colours found to match, e.g. be within a predetermined distance from an existing colour in the database, may then be used to suggest to the user cosmetic products having the same or complementary colour as the matched existing colour. Alternatively, the data representative of the colour of the user's skin can be used to create a custom formulation of a cosmetic product to match the user's skin using the cosmetic product mixer 401, as described above.

When the app 206 transmits 505 the data indicative of a colour of the user's skin to the server 301, additional data, such as what sort of cosmetic product the user would like mixing, e.g. foundation, may also be sent to the server 301.

When the server 301 receives the data indicating the colour of the user's skin, the server 301 identifies what ingredients, and how much of each ingredient, are required in order to produce the cosmetic product matching the user's skin, e.g. having the same CIELAB colour values as the user's skin. Once the required ingredients are determined, the server 301 may identify one or more of a plurality of cosmetic product mixers 401 which have the required ingredients and in the required quantities to create the cosmetic product. For example, cosmetic product mixers may periodically send status information to the server. The status information may inform the server 301 what ingredients and in what quantities each cosmetic product mixer 401 contains. The status information may also include what type of mixer 415 the cosmetic product mixer has installed (e.g. static mixer, rotating funnel mixer, Venturi mixer) or details regarding the vessel 422 and mixing component (e.g. the dimensions and shapes of the vessel and stirrer bar) or details regarding the magnetic stirrer.

The server 301 may select one of the identified one or more of the plurality of cosmetic product mixers 401 based on location information. For example, the server 301 may select a cosmetic product mixer 401 being located closest to the user, or may select the cosmetic product mixer 401 based on user selection. For example, a user may have provided information to the server, such as using the app 206, indicating a particular location that they wish to pick up there product from. Such location data may be stored in the user's profile or may be received at the time of sending 505 the data indicative of the user's skin colour to the server 301.

Once the server 301 has selected a cosmetic product mixer 401, the server sends 506 data indicative of a recipe for the cosmetic product to the cosmetic product mixer 401 to mix the product. The data indicative of the recipe for the cosmetic product may comprise recipe information, such as the ingredients, quantities of the ingredients, and/or mixing information, such as the order in which the ingredients are to be mixed. The server may also send user details to the cosmetic product mixer 401, such that the cosmetic product mixer 401 may identify the user upon collection of the cosmetic product 401. Prior to mixing, the cosmetic product mixer 401 may confirm that it contains the correct ingredients. If the cosmetic product mixer 401 determines that it does not have the correct ingredients, the cosmetic product mixer 401 may send a message to the server 301 indicating that it does not have the correct ingredients. The server 301 may then identify a different cosmetic product mixer 401 for mixing the product.

The server 301 may send a confirmation notification to the user device 201. The confirmation notification may inform the user that their order has been received. The confirmation notification may inform the user which cosmetic product mixer 401 to collect their product from, or give an indication as to when the user will receive their product if the cosmetic product is to be sent to the user by post.

In an implementation, the cosmetic product mixer 401 may automatically begin mixing the product as soon as it receives 506 the instructions to mix the product, or may wait until instructed by the user. For example, the user may go to the cosmetic product mixer 401 which has been sent the instructions, log in via the user interface 405 of the cosmetic product mixer 401, and select an option which causes the cosmetic product mixer 401 to mix and dispense the product.

Once the cosmetic product has been mixed and dispensed, the cosmetic product mixer may perform a cleaning routine. For example, the bulk ingredient used by the cosmetic product mixer 401 may be flushed through the mixer 415 and dispensing nozzle 421 following mixing of the cosmetic product, in arrangements in which a mixer 415 of the type described with respect to FIG. 7 is used. In an implementation, the bulk ingredient is dispensed both at the beginning and end of the production routine to either coat or clean the mixer 415. As bulk is used in the cosmetic product, flushing the bulk through the mixer cleans the mixer while reducing contamination of subsequent cosmetic products to be mixed.

The server 301 may store data related to each user and/or each request for a cosmetic product received by the user. That is, information relating to any order may be stored centrally by the server 301. This may be advantageous for quality control purposes. For example, if a user reports an issue with a particular product obtain from the mixer 401, the details of the particular request (such as user ID, cosmetic product mixer ID, ingredients ID, etc) are stored at the server and can be accessed by the server to trace the cause of the issue. For example, an ID of the mixer and optionally of the particular batch of ingredients used can be determined and corrective action may be taken. For example, the mixer 401 may be placed in a suspended mode, where further mixing is prevented from taking place. An engineer may be dispatched to the mixer 401 to remedy the issue.

Any suitable protocol may be used to transmit data between the user device 201, the server 301 and the mixer 401. In a preferred implementation, a Message Queuing Telemetry Transport MQTT (MQTT) protocol is used. For example, the mixer 401 may subscribe to the server 301 to receive the data indicative of a recipe for the cosmetic product. This negates the need for the mixer 401 to obtain special permission from, for example, a firewall running on a local network to which the mixer 401 is connected. In some implementations, the server 301 may act as an MQTT bridge between one or more mixers 401 and one or more user devices 201.

In other implementations, the mixer 401 may be able to operate as a Wi-Fi hub (sometimes known as a Wi-Fi hot spot), which a user device 201 may connect to. For example, if a user is at a location, such as a shop, which has a mixer 401, the user may be able to connect to the mixer 401 as a Wi-Fi hub. The mixer 401, may then be able to forward data from the user device 201 to the server 301. This may be useful if the local network to which the mixer 401 is connected is not available to the user device 201.

Figure 11:
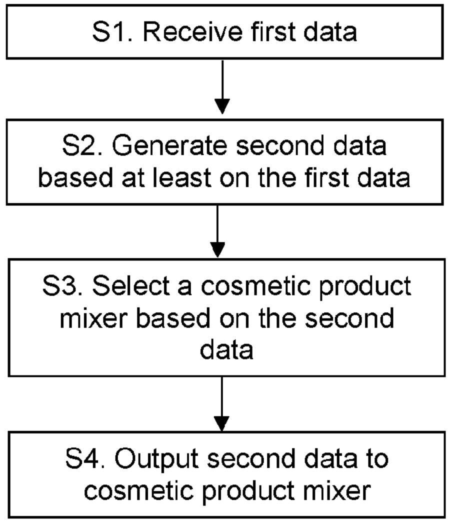
FIG. 11 shows a flow chart of a method according to the present disclosure.

FIG. 11 depicts a flow chart of a method for preparing a customised cosmetic product.

At step S1 first data indicative of a biometric measurement of the user is received. For example, the first data may be received at the server 301 described above.

At step S2 second data is generated based at least on the first data, the second data indicative of a recipe of a cosmetic product.

At step S3, a cosmetic product mixer is selected from a plurality of cosmetic product mixers, said selection based at least on the second data.

At step S4, the second data is output to the selected cosmetic product mixer.

Although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

While the examples described have referred to producing a customised cosmetic product to match a colour by mixing ingredients using a particular recipe, the method also allows customisation of cosmetic products for improving or modifying the way a user's skin feels, based on mixing the active ingredients according to a particular recipe. The active ingredients may be determined based on biometric measurements of the user, such as the user's skin type, sebum level, moisturisation level, for example. For example, if a user has a dry skin type, a recipe may be produced having particular active ingredients which provide greater moisturisation. Other customisation of particular cosmetic products may be based on other biometric measurements of a user, such as the user's oxygen blood level.

While the imaging device 101 has been described as having a battery, it will be appreciated that power may be supplied via a wire contact, such as mains power, or power from a user device such as a laptop.

It will be appreciated that while the user device 201, such as a mobile phone, has been described, the imaging device may connect directly to a server using any suitable means, such as LPWAN, rather than via user device 201, so as to send the data indicative of the colour of the user's skin.

It will be appreciated that the server 301 may comprise a number of different servers, and that functions described as being carried out at the server may be distributed over a number of different servers.

While the described implementations of the cosmetic product mixer have been described with reference to a server, user device, and imagining device, it will be appreciated that in some implementations the cosmetic product mixer may be used without one or more of a server, user device, and imagining device. For example, a user may input data directly into the cosmetic product mixer, such as a biometric measurement, or data indicative of a recipe, and the cosmetic product mixer may prepare a cosmetic product according to any of the methods described herein.

The app and/or the imaging device 101 may output a machine readable code to the user, such as a hex code, which identifies the data representative of the colour of the user's skin. This allows a user to manually input the hex code into any cosmetic product mixer 401 via the user interface 405.

While an app 206 has been described, it will be appreciated that this is optional. For example, a web page/web portal may be used instead for registering to a service as described above.

While CIELAB colour models have been described to indicate the colour of a user's skin, any suitable model may be used, such as the LCH colour model.

The invention claimed is:

1. A method for preparing a customised cosmetic product, comprising:

receiving first data, the first data indicative of a biometric measurement of the user;

generating second data based at least on the first data, the second data indicative of a recipe of a cosmetic product;

selecting a cosmetic product mixer from a plurality of cosmetic product mixers, said selection based at least on the second data; and outputting the second data to the selected cosmetic product mixer.

2. A method according to claim 1, further comprising:

generating the first data, wherein generating the first data comprises imaging a portion of the user to obtain the first data, wherein the biometric measurement is a measurement of a colour associated with the user.

3. A method according to claim 1, further comprising:

mixing a cosmetic product based on the second data and dispensing the cosmetic product.

4. A method according to claim 1, wherein selecting a cosmetic product mixer from a plurality of cosmetic product mixers based on the second data comprises:

selecting the cosmetic product mixer based on a determination that the cosmetic product mixer comprises required ingredients of the recipe.

5. A method according to claim 1, wherein selecting a cosmetic product mixer from a plurality of cosmetic product mixers further comprises:

receiving third data indicative of a location associated with the user;

determining fourth data indicative of locations associated with the plurality of cosmetic product mixers;

selecting the cosmetic product mixer based on the third data and fourth data.

6. A method according to claim 1, further comprising, at the cosmetic product mixer:

storing in a memory the second data;

receiving a command at a user interface;

on receiving the command, dispensing and mixing the ingredients of the cosmetic product based on the second data.

7. A method according to claim 1, wherein mixing the cosmetic product comprises the steps of:

dispensing ingredients according to a recipe for the cosmetic product into a vessel containing a mixing component;

mixing the ingredients with the mixing component to form a mixed intermediate; and increasing the viscosity of the mixed intermediate to form the cosmetic product by:

(i) ceasing mixing of the mixed intermediate;

(ii) ceasing mixing of, and adding a further ingredient to, the mixed intermediate; or (iii) adding a further ingredient to the mixed intermediate, optionally with continued mixing using the mixing component.

8. A method according to claim 7, wherein the mixing component is a magnetic stirrer bar and mixing is effected by a magnetic stirrer.

9. A method according to claim 7, wherein the mixing component is retained in the vessel.

10. A method according to claim 7, wherein the ingredients are dispensed directly into the vessel.

11. A method according to claim 7, wherein dispensing is effected by pumping the ingredients from one or more reservoirs.

* * * * *